(12) United States Patent
Sakai et al.

(10) Patent No.: US 7,295,910 B2
(45) Date of Patent: Nov. 13, 2007

(54) VEHICLE OCCUPANT DISCRIMINATING APPARATUS

(75) Inventors: Morio Sakai, Toyota (JP); Hideo Haneda, Chiryu (JP); Masaki Mori, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/384,492

(22) Filed: Mar. 21, 2006

(65) Prior Publication Data

US 2006/0217862 A1  Sep. 28, 2006

(30) Foreign Application Priority Data

Mar. 22, 2005 (JP) ............................. 2005-081334

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl. .................... 701/45; 180/273; 280/735
(58) Field of Classification Search ............... 701/45, 701/50; 702/173; 307/10.1; 180/273; 280/735
See application file for complete search history.

(56) References Cited

U.S. PATENT DOCUMENTS

| 5,624,132 | A  | * | 4/1997  | Blackburn et al. .......... 280/735 |
| 6,519,551 | B1 | * | 2/2003  | Reich et al. ................ 702/173 |
| 6,520,535 | B1 |   | 2/2003  | Stanley et al. |
| 6,577,023 | B1 | * | 6/2003  | Stanley et al. ............. 307/10.1 |
| 6,609,054 | B2 | * | 8/2003  | Wallace ....................... 701/45 |
| 6,952,975 | B2 | * | 10/2005 | Nishio et al. .......... 73/862.451 |
| 7,026,946 | B2 | * | 4/2006  | Saunders et al. ............ 340/666 |
| 7,164,117 | B2 | * | 1/2007  | Breed et al. ................ 250/221 |
| 7,222,879 | B2 | * | 5/2007  | Ishida ........................ 280/735 |
| 2002/0117837 | A1 |   | 8/2002  | Ingemarsson |
| 2003/0001749 | A1 | * | 1/2003  | Ishida ........................ 340/667 |
| 2003/0209893 | A1 | * | 11/2003 | Breed et al. ................ 280/735 |
| 2003/0220766 | A1 | * | 11/2003 | Saunders et al. ........... 702/173 |
| 2004/0006418 | A1 | * | 1/2004  | Sakai .......................... 701/45 |
| 2004/0174004 | A1 |   | 9/2004  | Smith et al. |
| 2005/0131605 | A1 | * | 6/2005  | Nakamoto et al. ............ 701/45 |
| 2005/0209754 | A1 | * | 9/2005  | Kiribayashi ................. 701/45 |
| 2006/0217862 | A1 | * | 9/2006  | Sakai et al. .................. 701/45 |
| 2007/0021891 | A1 | * | 1/2007  | Fleet ........................... 701/45 |
| 2007/0061102 | A1 | * | 3/2007  | Kim ........................... 702/173 |

FOREIGN PATENT DOCUMENTS

| JP | 09-207638 A | 8/1997 |
| JP | 2003-341403 A | 12/2003 |
| JP | 2004-301691 A | 10/2004 |
| WO | WO 01/17825 A | 3/2001 |

* cited by examiner

*Primary Examiner*—Thomas Black
*Assistant Examiner*—Jorge O Peche
(74) *Attorney, Agent, or Firm*—Sughrue Mion, PLLC

(57) ABSTRACT

A vehicle occupant discrimination apparatus is provided, which is capable of precisely discriminating a vehicle occupant using load data detected by a small number of load sensors for detecting a load applied to a vehicle seat. In a vehicle occupant discrimination apparatus for discriminating the kind of an occupant on a vehicle seat on the basis of the load applied to the vehicle seat, the apparatus includes state detecting means for detecting the occupant state on the vehicle seat, load measuring means for measuring the load applied to the vehicle seat, and discriminating means for discriminating the kind of the occupant on the basis of a discrimination condition differing in accordance with the result detected by the state detecting means and the result measured by the load measuring means.

7 Claims, 19 Drawing Sheets

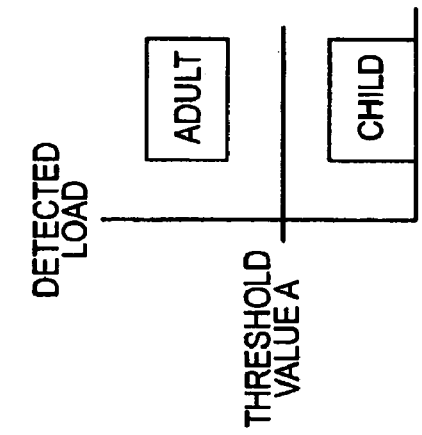
FIG. 3A
ADULT
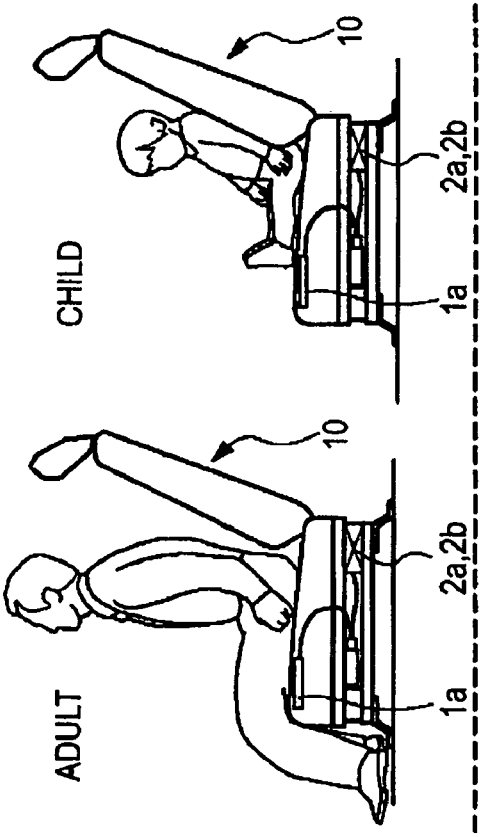
FIG. 3B
CHILD
FIG. 3C
DETECTED LOAD
ADULT
THRESHOLD VALUE A
CHILD
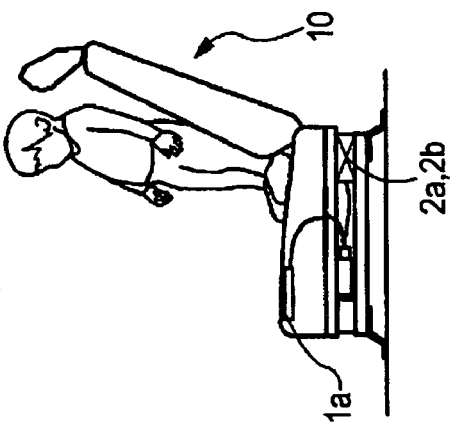
FIG. 3D
FIG. 3E
DETECTED LOAD
ADULT
THRESHOLD VALUE B
THRESHOLD VALUE A
CHILD
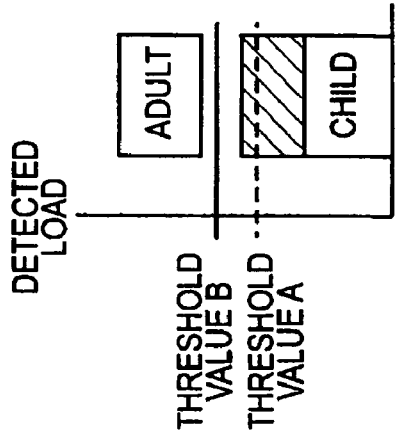

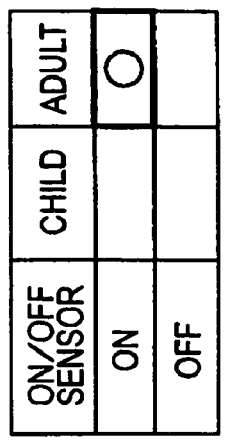
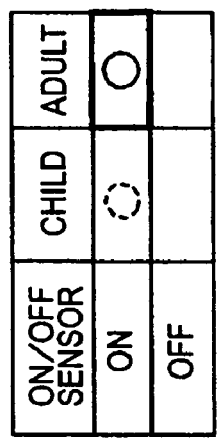
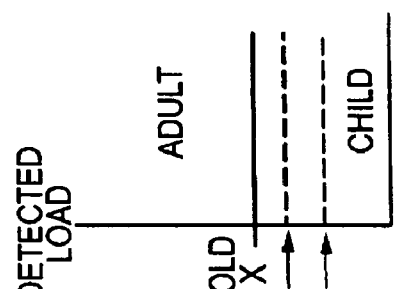
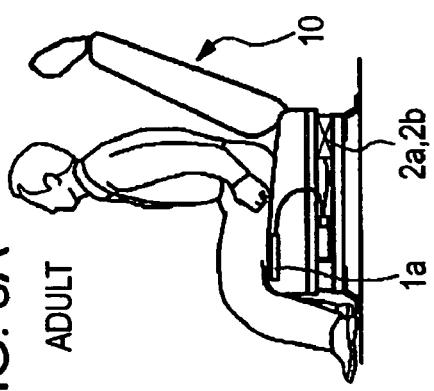
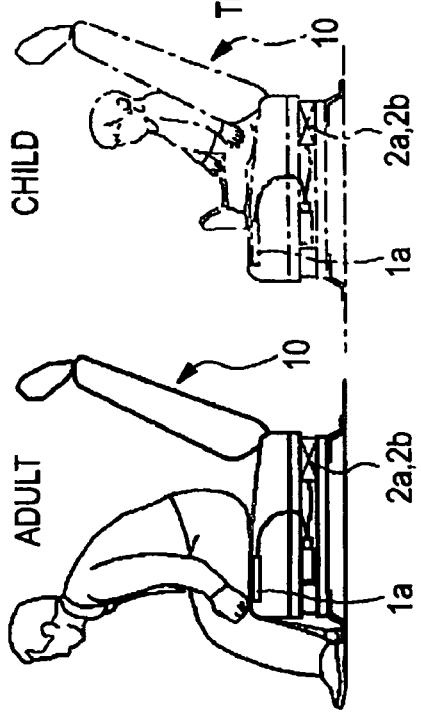

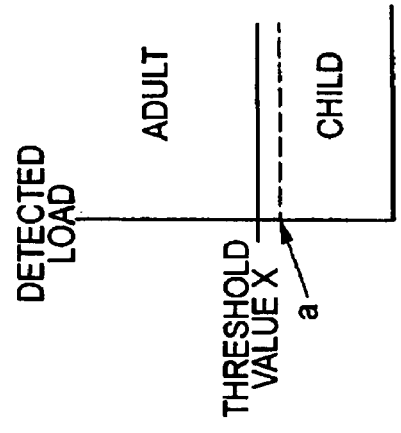
FIG. 9A
CHILD
FIG. 9B
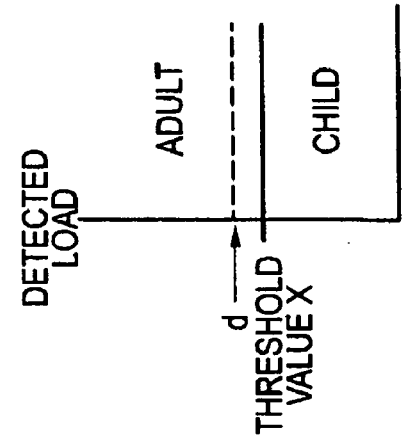
FIG. 9D
CHILD
FIG. 9E
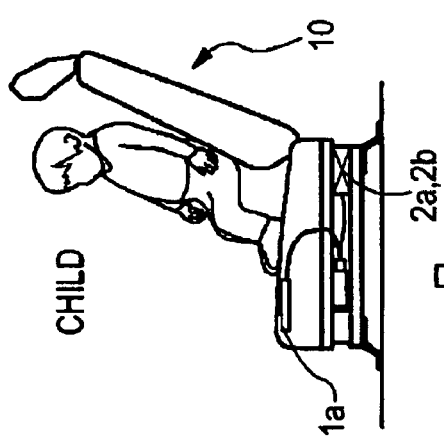
FIG. 9C
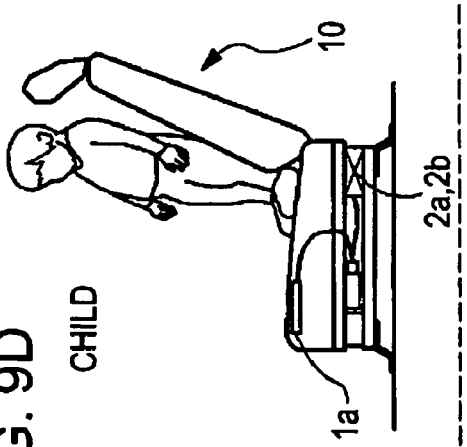
FIG. 9F

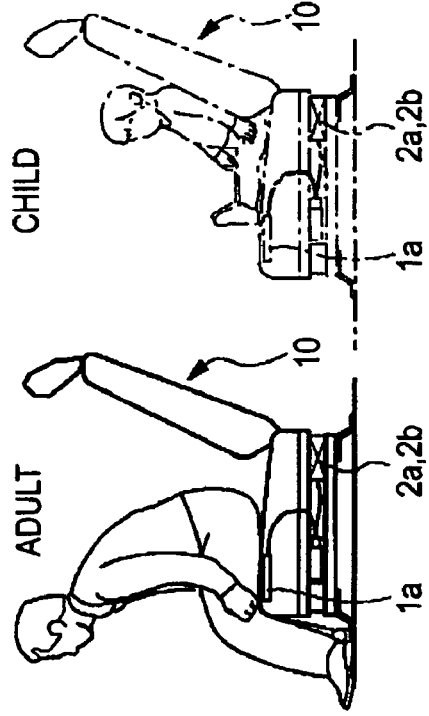
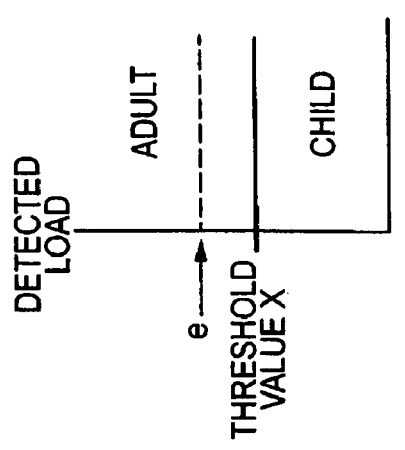
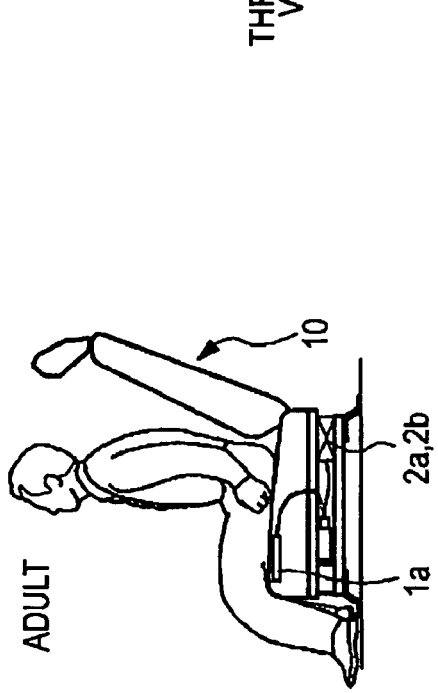

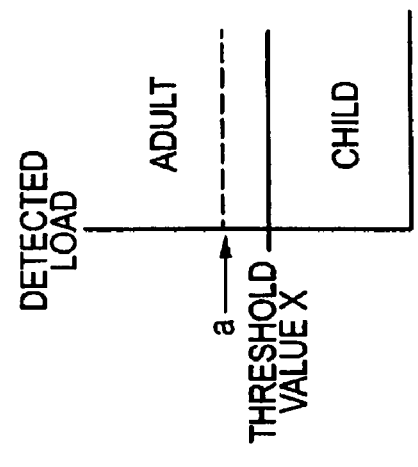
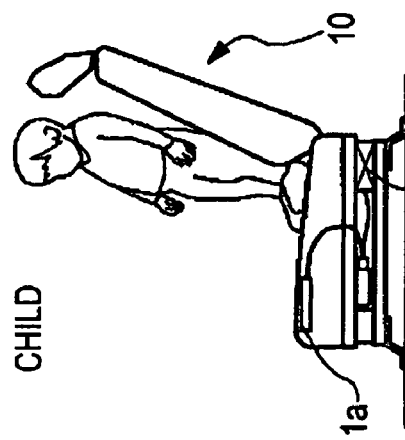
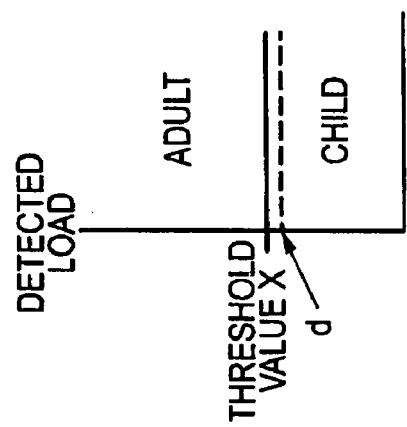
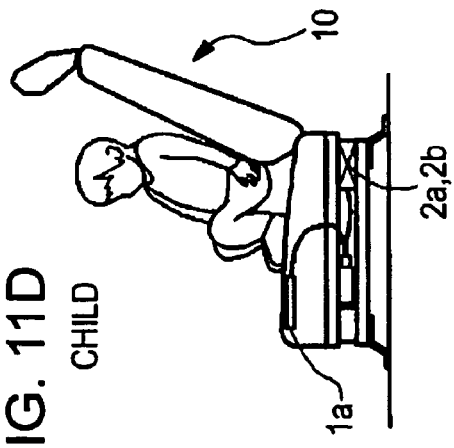

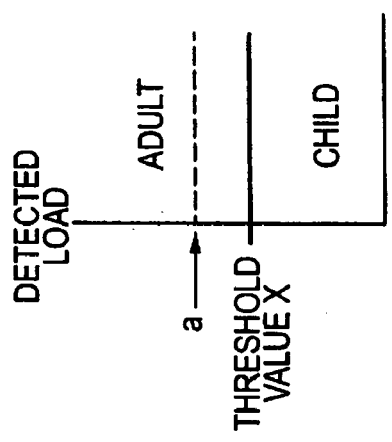
FIG. 12A
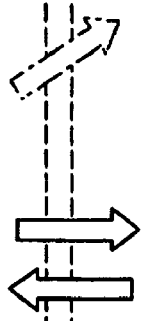
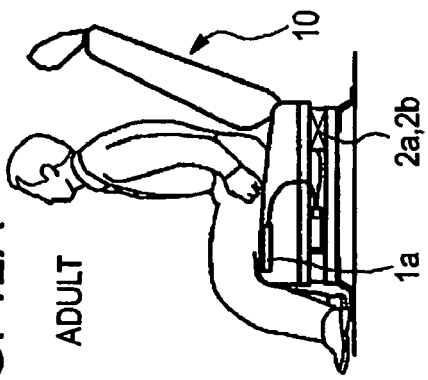
FIG. 12D
FIG. 12E
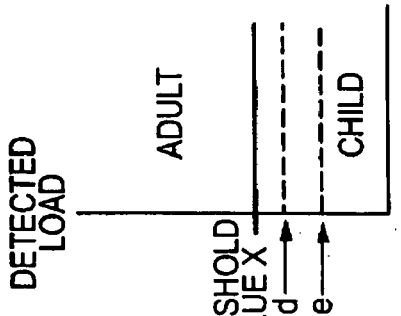
FIG. 12C
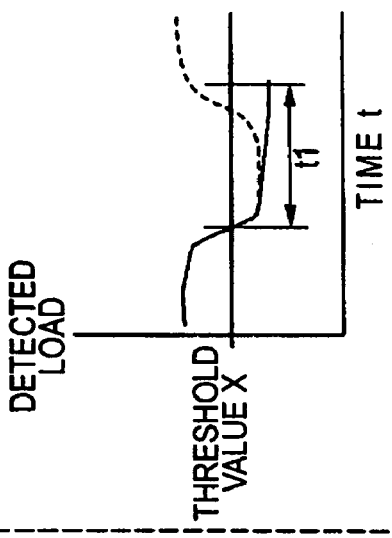
FIG. 12B
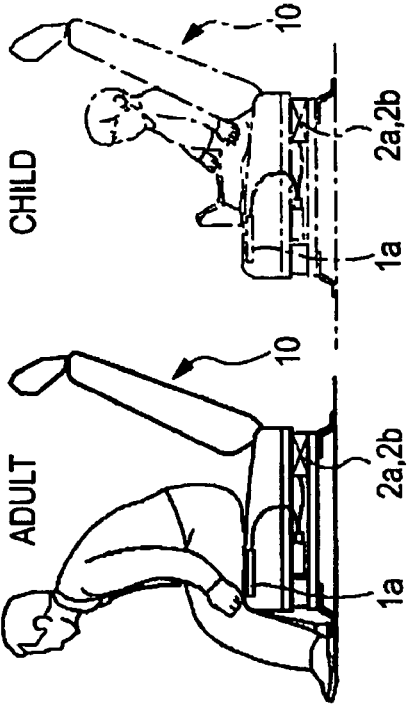
FIG. 12F
FIG. 12G

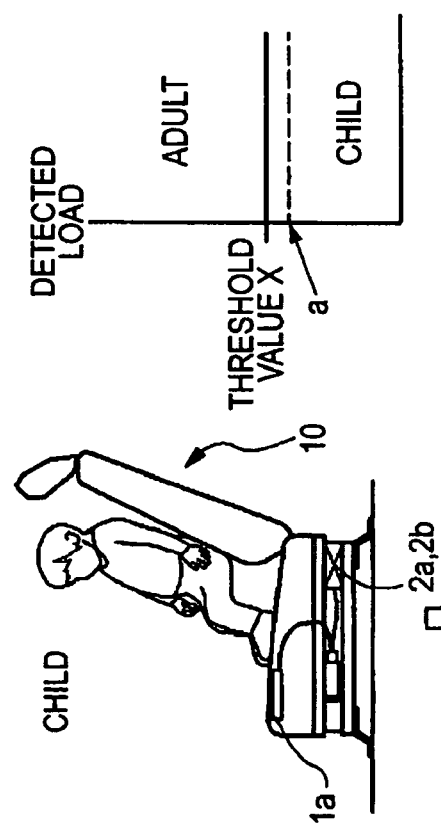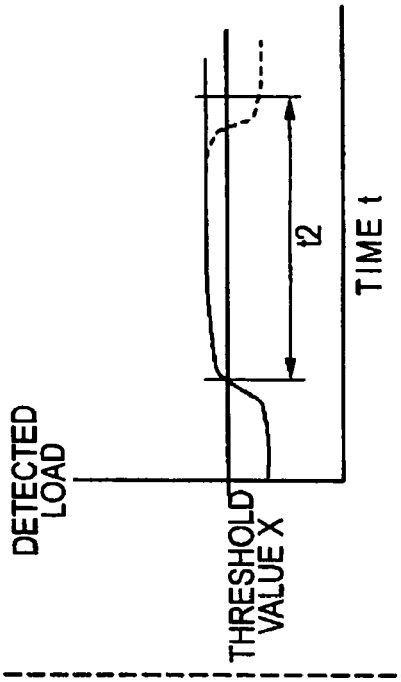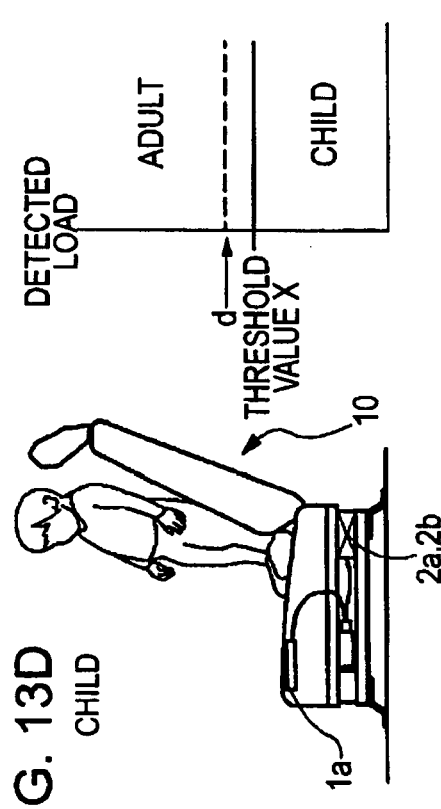

FIG. 14A ADULT
FIG. 14B CHILD

FIG. 14E ADULT

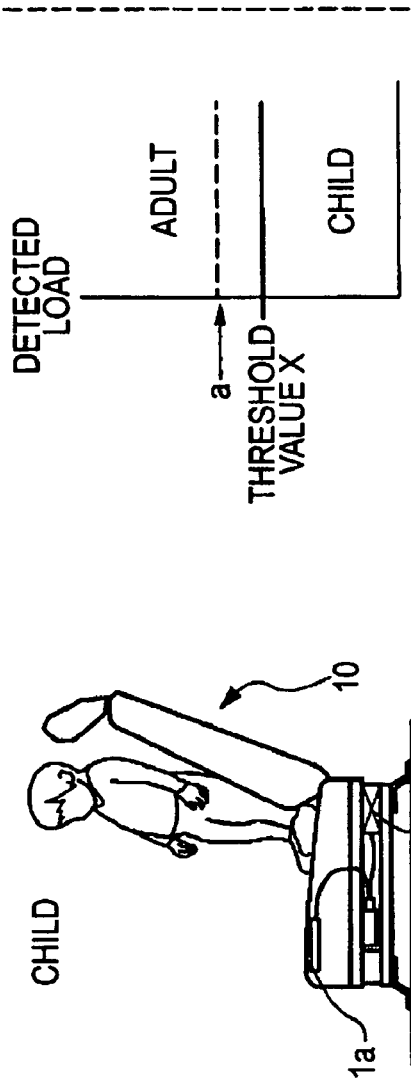
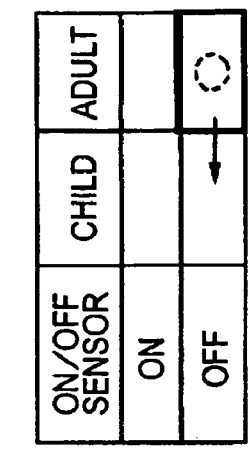
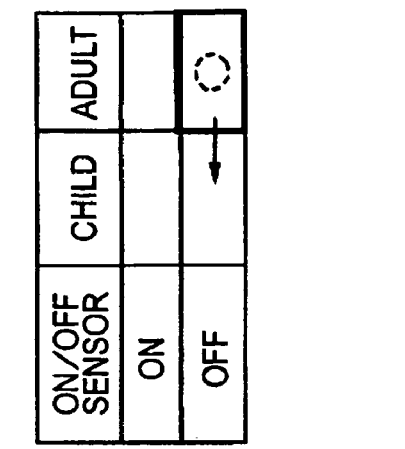
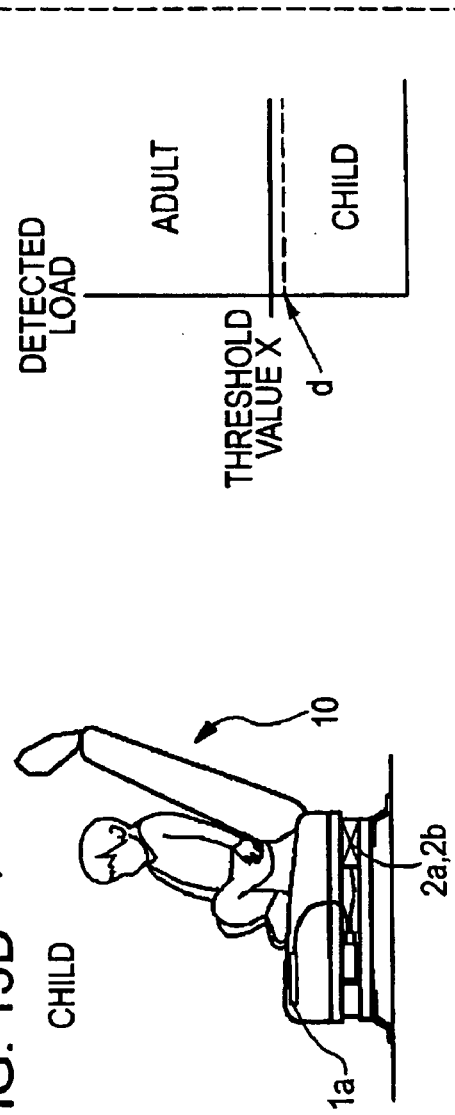
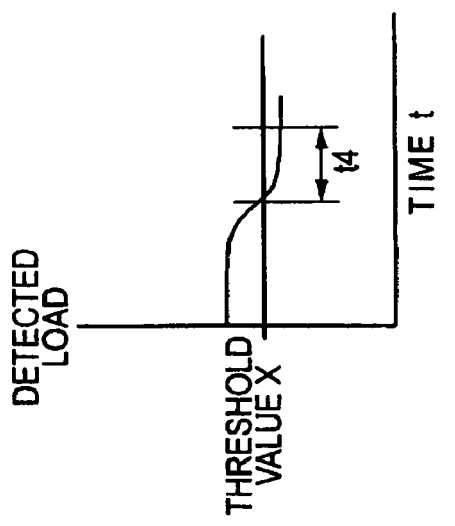

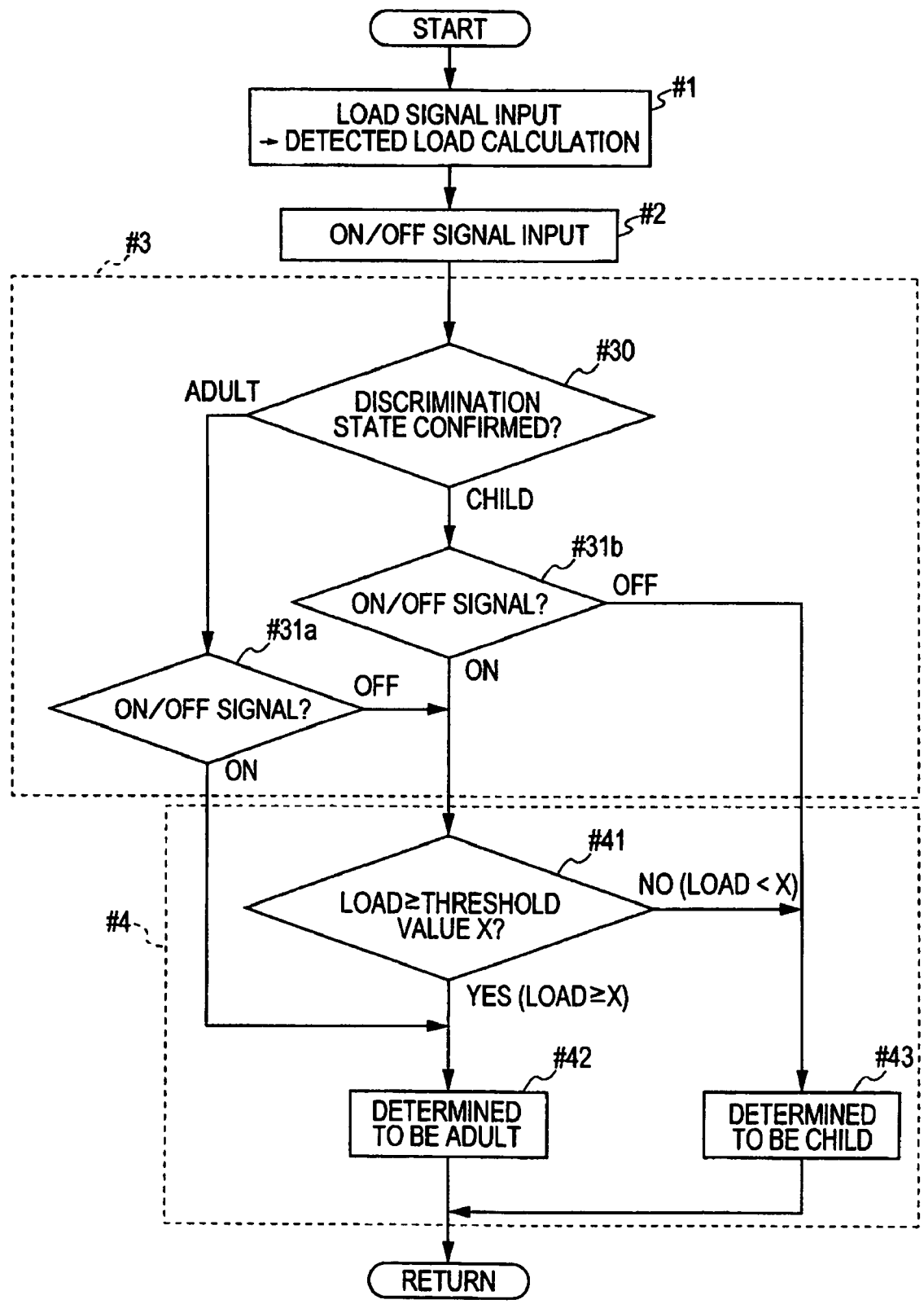

VEHICLE OCCUPANT DISCRIMINATING APPARATUS

CROSS REFERENCES TO RELATED APPLICATIONS

This application is based on and claims priority under 35 U.S.C. § 119 with respect to Japanese Patent Application No. 2005-081334 filed on Mar. 22, 2005, the entire content of which is incorporated herein by reference.

BACKGROUND OF THE INVENTION

1. Field of the Invention

The present invention relates to a vehicle occupant discriminating apparatus for discriminating an occupant on a vehicle seat based on the load applied to the vehicle seat.

2. Description of the Related Art

Such a vehicle occupant discriminating apparatus is used for determining whether an occupant is seated on a front passenger seat where an airbag system is provided, for example. That is, if no occupant is seated on the front passenger seat, operation of the airbag system is meaningless and expenses are necessary for its recovery, so that the airbag system is operated based on the determined result. It is more effective to change the airbag operation method, such as airbag inflation speed and direction, and to operate the airbag or not, on the basis that the sitting occupant is an adult or child and the occupant is large or small in pattern. Thus, it is very preferable that the vehicle occupant discriminating apparatus discriminate not only whether an occupant is seated but also discriminate the occupant including his or her physical constitution.

Various kinds of such a vehicle occupant discriminating apparatus have been proposed, and in Japanese Unexamined Patent Application Publication No. H09-207638 (first to sixth and eighteenth and nineteenth paragraphs, FIGS. 1 and 5), an apparatus capable of securely detecting the presence of an occupant is disclosed, for example. In the occupant detecting apparatus in the Publication, load sensors are provided at only two positions among multiple (four usually) fitting positions between a vehicle seat and a floor. This means that the load sensors are only attached to any two positions of the four seat-fitting positions that are lateral, back-and-forth, and diagonal positions. This apparatus can clearly distinguish between a vacant state and an occupied state even when the load sensors are attached to any of the positions.

In Japanese Unexamined Patent Application Publication No. 2003-341403 (second, fourteenth to sixteenth, twenty-third, thirty-second, and thirty-ninth paragraphs, FIGS. 4 to 7), an apparatus that can precisely detect the kind of an occupant (adult, child, or vacant) on a seat is also disclosed. In this apparatus, by adding up detected respective load values from load sensors arranged at four lateral and back-and-forth positions below the vehicle seat, a total load is calculated. Then, on the basis of the total load, the kind of the occupant (adult, child, or vacant) is determined so as to output a drive signal for changing the inflation amount of the airbag system, for example, on the basis of the kind of the occupant.

In the apparatus of Japanese Unexamined Patent Application Publication No. 2003-341403, the precise occupant detection is achieved; however, four load sensors are used therefor. On the other hand, the apparatus of Japanese Unexamined Patent Application Publication No. H09-207638 can work with two load sensors; however, it can detect the presence of an occupant but cannot determine the kind of the occupant. That is, in any of the above prior arts, the reduction in the number of the load sensors is incompatible with the precise determination of an occupant even to its kind.

When the load sensors at the four positions are used for detecting the load on the vehicle seat, the load is not be applied to the four positions uniformly in general. In the vehicle seat, while the front portion is slightly raised, the rear portion is slightly sunk so as to have a structure capable of easily resting oneself on a seat back. Hence, the occupant load is mainly applied to the rear portion. Then, the load sensors may be provided only on the rear lateral positions; however, if a child is standing on the seat, the load is concentrated only on the rear portion so that a minus load may be applied to the front portion. If the load sensors are arranged only on the rear side at this time, since the minus load on the front side is not added, a large load is mistakenly detected consequently. As a result, a child on the vehicle seat may be determined to be an adult.

SUMMARY OF THE INVENTION

The present invention has been made in view of the problems described above, and it is an object of the present invention to provide a vehicle occupant discriminating apparatus capable of precisely discriminating an occupant using data detected by few load sensors in number arranged at parts of a vehicle seat to which a load is applied.

In order to achieve the object mentioned above, in a vehicle occupant discrimination apparatus for discriminating the kind of an occupant on a vehicle seat on the basis of the load applied to the vehicle seat according to the present invention, the apparatus includes state detecting means for detecting the occupant state on the vehicle seat; load measuring means for measuring the load applied to the vehicle seat; and discriminating means for discriminating the kind of the occupant on the basis of a discrimination condition discriminating whether the occupant is an adult or a child and the result measured by the load measuring means, wherein the discriminating means discriminates the kind of the occupant on the basis of the discrimination condition differing in accordance with the result detected by the state detecting means.

According to the featured configuration, the occupant sitting state on the vehicle seat can be detected by the state detecting means. For example, the state detecting means can detect whether a child is standing or not. Also, using the discrimination condition differing corresponding to the result detected by the state detecting means, the occupant is discriminated. For example, when a child is standing on the vehicle seat, a load rather larger than a normal load may be detected because of the concentration of the load. In this case, if the occupant would be discriminated on the basis of the normal discrimination condition, it might be determined to be "adult". Whereas, if the occupant is discriminated using the discrimination condition corresponding to the result detected by the state detecting means, the occupant can be determined to be "child" in view of the standing posture of the child. In such a manner, the occupant is discriminated on the basis of the discrimination condition differing in accordance with the result detected by the state detecting means and the result measured by the load measuring means, so that the occupant can be precisely discriminated using load data.

In addition, "discrimination between an adult and a child" is not a legal and age condition but a physical constitution.

Hence, "discrimination between a large build and a small build" is also included in the technical field of the present invention. Not only alternatives such as "adult or child" and "large or small" but also choices between three or more things such as "adult, child, or infant" and "large, normal, or small" belong to the technical range of the present invention.

Preferably, the discriminating means discriminates the kind of the occupant on the basis of the discrimination conditions differing from a case, where the load measured by the load measuring means varies from a smaller side to a larger side, to a case where it varies from the larger side to the smaller side.

When the result by the load measuring means varies up and down in the vicinity of the boundary between the discrimination conditions, the occupant kind is frequently switched. For example, the discriminated result may be switched due to the load fluctuating corresponding to the small change in posture such as stretching and turning around. This is not preferable in precisely discriminating the occupant kind, so that when the occupant kind is discriminated on the basis of the discrimination conditions differing from a case, where the load measured by the load measuring means varies from the smaller side to the larger side, to a case where it varies from the larger side to the smaller side, such problem is preferably solved.

Preferably, the load measuring means measures the load applied to the rear side of the vehicle seat and the state detecting means detects a presence of an occupant body on the front side of the vehicle seat.

Also, preferably, when the state detecting means detects the presence of the occupant, the discriminating means discriminates the kind of the occupant on the basis of a first discrimination condition while discriminates the kind of the occupant on the basis of a second discrimination condition using a larger load than that in the first discrimination condition when the state detecting means detects no presence of the occupant.

When the load applied to the vehicle seat is detected, the total load may be calculated generally using four load sensors. However, the load is not necessarily applied uniformly on the four sensors. As described above, the vehicle seat may be constructed with the slightly raised front side and with the slightly sunk rear side so that an occupant may easily recline on the back. Therefore, the load due to an occupant sitting in a generally supposed posture is mainly applied to the rear side. Accordingly, when the load measuring means according to the present invention measures the load applied to the rear side of the vehicle seat, the load applied to the vehicle seat can be measured substantially precisely with a small number of load sensors. This is postulated that the occupant is sitting in a generally supposed posture, and this is guaranteed by the result detected by the state detecting means. That is, when the occupant is sitting in a generally supposed posture, the body of the occupant, such as legs, must exist on the front side of the vehicle seat. Thus, when the state detecting means can detect the presence of the occupant body on the front side of the vehicle seat, the sitting posture of the occupant can be detected.

The discriminating means discriminates the occupant using any one of the first and second conditions on the basis of the result detected by the state detecting means, so that the occupant can be precisely discriminated. If the presence of the occupant body is not detected by the state detecting means, the standing child on the seat may be supposed, for example. In this case, in consideration that the load of the occupant (child) is measured to be larger than that in a normal posture, the discrimination condition (second discrimination condition) using a larger load is applied. Consequently, a vehicle occupant discrimination apparatus can be provided which is capable of precisely discriminating a vehicle occupant using load data detected by a small number of load sensors.

Preferably, the discriminating means includes discrimination state confirming means for confirming a former discrimination state, and wherein when the former discrimination state is an adult, the discriminating means discriminates the kind of the occupant on the basis of a third discrimination condition using a smaller load than that in the first discrimination condition while discriminates the kind of the occupant on the basis of the result detected by the state detecting means when the former discrimination state is a child.

Preferably, the discriminating means includes discrimination state confirming means for confirming a former discrimination state, wherein when the former occupant kind is an adult and the presence of an occupant body is detected by the state detecting means, or when the former occupant kind is a child and the presence of an occupant body is not detected by the state detecting means, the discriminating means determines the former occupant to be the kind of the occupant, and wherein when the former discrimination state is other than the states described above, the discriminating means discriminates the kind of the occupant on the basis of the result measured by the load measuring means.

Preferably, when the kind of the occupant discriminated on the basis of the discrimination condition changes to the kind different from that before load change in accordance with the load change due to change in sitting posture of the occupant, the discriminating means holds the kind before the load change for a predetermined time established on the basis of the kind before the load change and the result detected by the state detecting means.

In order to achieve the object described above, in a vehicle occupant discrimination apparatus for discriminating the kind of an occupant on a vehicle seat on the basis of the load applied to the vehicle seat according to another aspect of the present invention, the apparatus includes state detecting means for detecting the occupant state on the vehicle seat; load measuring means for measuring the load applied to the vehicle seat by the sitting of the occupant; and discriminating means for discriminating the kind of the occupant on the basis of a discrimination condition discriminating whether the occupant is an adult or a child and the result measured by the load measuring means, wherein when the kind of the occupant discriminated on the basis of the discrimination condition changes to the kind different from that before load change in accordance with the load change due to change in sitting posture of the occupant, the discriminating means holds the kind before the load change for a predetermined time established on the basis of the kind before the load change and the result detected by the state detecting means.

As described above, the result measured by the load measuring means may vary due to the load fluctuating corresponding to the small change in occupant posture such as stretching and turning around. The determined result on the basis of the detected result may also be switched due to the change in detected result. However, the occupant posture such as stretching and turning around is not generally permanent during traveling in a vehicle. In general, it is returned to a normal posture after the elapse of a predetermined time. Then, when the kind discriminated before the load change is held for a predetermined time as the configuration mentioned above, the meaningless switching of the discriminated result cannot preferably be generated. This predetermined time is established on the basis of the kind before the load change and the result detected by the state detecting means. Therefore, when the kind before the load change that is the former discriminated result is possibly different from the kind supposed from the result detected by the state detecting means, the predetermined time can be reduced. Inversely, when the discriminated result possibly agrees with the supposed kind, the predetermined time can be increased. That is, such flexible setting is possible. As a result, a vehicle occupant discrimination apparatus capable of precisely discriminating a vehicle occupant using load data can be provided.

Preferably, the load measuring means measures the load applied to the rear side of the vehicle seat and the state detecting means detects the presence of an occupant body on the front side of the vehicle seat.

As described above, the load due to an occupant sitting on a seat in a generally supposed posture is mainly applied to the rear portion of the seat. Accordingly, when the load measuring means according to the present invention measures the load applied to the rear side of the vehicle seat, the load applied to the vehicle seat can be measured substantially precisely with a small number of load sensors. This is postulated that the occupant is sitting in a generally supposed posture, and this is guaranteed by the result detected by the state detecting means. That is, when the occupant is sitting in a generally supposed posture, the body of the occupant, such as legs, must exist on the front side of the vehicle seat. Thus, when the state detecting means can detect the presence of the occupant body on the front side of the vehicle seat, the sitting posture of the occupant can be detected.

In order to achieve the object described above, in a vehicle occupant discrimination apparatus for discriminating the kind of an occupant on a vehicle seat on the basis of the load applied to the vehicle seat according to another aspect of the present invention, the apparatus includes state detecting means for detecting the occupant state on the vehicle seat; load measuring means for measuring the load applied to the vehicle seat by the sitting of the occupant; and discriminating means for discriminating the kind of the occupant on the basis of a discrimination condition discriminating whether the occupant is an adult or a child and the result measured by the load measuring means, wherein the discriminating means discriminates the kind of the occupant on the basis of the discrimination condition differing in accordance with the result detected by the state detecting means, and wherein when the kind of the occupant discriminated on the basis of the discrimination condition changes to the kind different from that before load change in accordance with the load change due to change in sitting posture of the occupant, the discriminating means holds the kind before the load change for a predetermined time established on the basis of the kind before the load change and the result detected by the state detecting means.

According to this featured configuration, the discriminating means discriminates the kind of the occupant on the basis of the discrimination condition differing in accordance with the result detected by the state detecting means and the result measured by the load measuring means. Furthermore, when the discriminated result changes to the kind different from that before load change in accordance with the load change due to change in sitting posture of the occupant, the discriminating means holds the kind before the load change that is the former discriminated result for a predetermined time established on the basis of the former discriminated result and the result detected by the state detecting means. Accordingly, as described above, a vehicle occupant discrimination apparatus can be provided which is capable of precisely discriminating a vehicle occupant even using load data detected by a small number of load sensors.

BRIEF DESCRIPTION OF THE DRAWINGS

FIGS. 3A to 3E are drawings illustrating the principle for discriminating an occupant on the basis of discrimination conditions differing corresponding to the result detected by the state detecting means and the result measured by the load measuring means;

FIGS. 8A to 8G are drawings illustrating a first case for discriminating an occupant on the basis of the former discriminated result, the result detected by the state detecting means, and the result measured by the load measuring means;

FIGS. 9A to 9F are drawings illustrating a second case for discriminating an occupant on the basis of the former discriminated result, the result detected by the state detecting means, and the result measured by the load measuring means;

FIGS. 10A to 10G are drawings illustrating a third case for discriminating an occupant on the basis of the former discriminated result, the result detected by the state detecting means, and the result measured by the load measuring means:

FIGS. 11A to 11F are drawings illustrating a fourth case for discriminating an occupant on the basis of the former discriminated result, the result detected by the state detecting means, and the result measured by the load measuring means;

FIGS. 12A to 12G are drawings for illustrating a first case in that the occupant is discriminated by maintaining the former discrimination result for a predetermined time established on the basis of the former discrimination result and the result detected by the state detecting means;

FIGS. 13A to 13F are drawings for illustrating a second case in that the occupant is discriminated by maintaining the former discrimination result for a predetermined time established on the basis of the former discrimination result and the result detected by the state detecting means;

FIGS. 14A to 14G are drawings for illustrating a third case in that the occupant is discriminated by maintaining the former discrimination result for a predetermined time established on the basis of the former discrimination result and the result detected by the state detecting means;

FIGS. 15A to 15F are drawings for illustrating a fourth case in that the occupant is discriminated by maintaining the former discrimination result for a predetermined time established on the basis of the former discrimination result and the result detected by the state detecting means;

FIG. 16 is a flowchart showing an example procedure for discriminating an occupant on the basis of the former discriminated result, the result detected by state detecting means, and the result measured by load measuring means;

DESCRIPTION OF THE PREFERRED EMBODIMENTS

Preferred embodiments of the present invention will be described below with reference to the drawings.

[System Configuration]

Figure 1A:
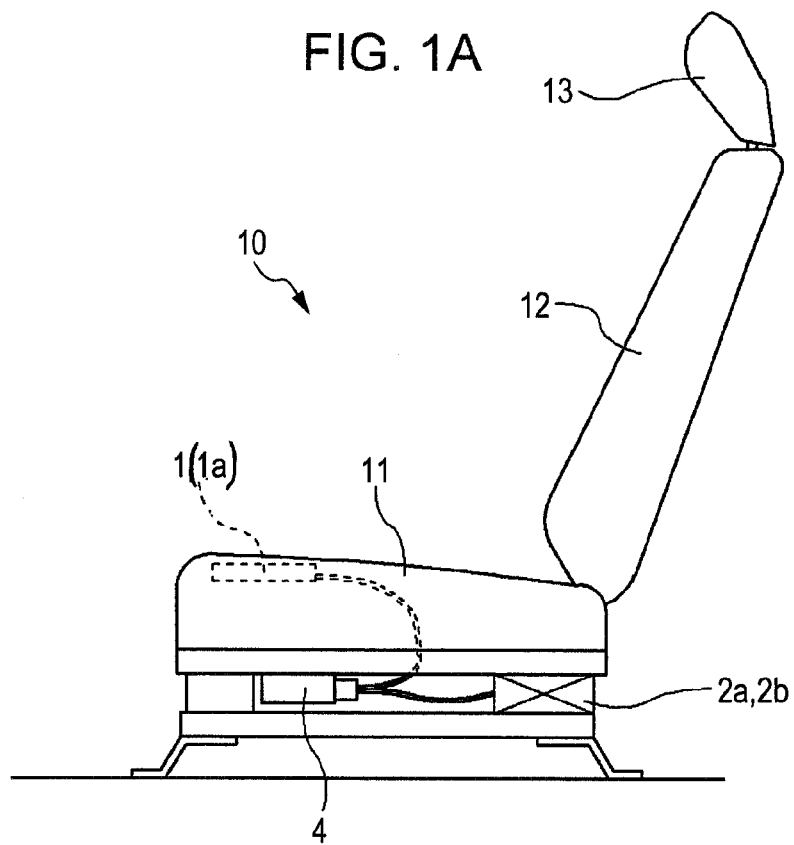
FIGS. 1A and 1B are block diagrams of a vehicle occupant discriminating apparatus according to the present invention showing its setting conformation, as an example.
Figure 1B:
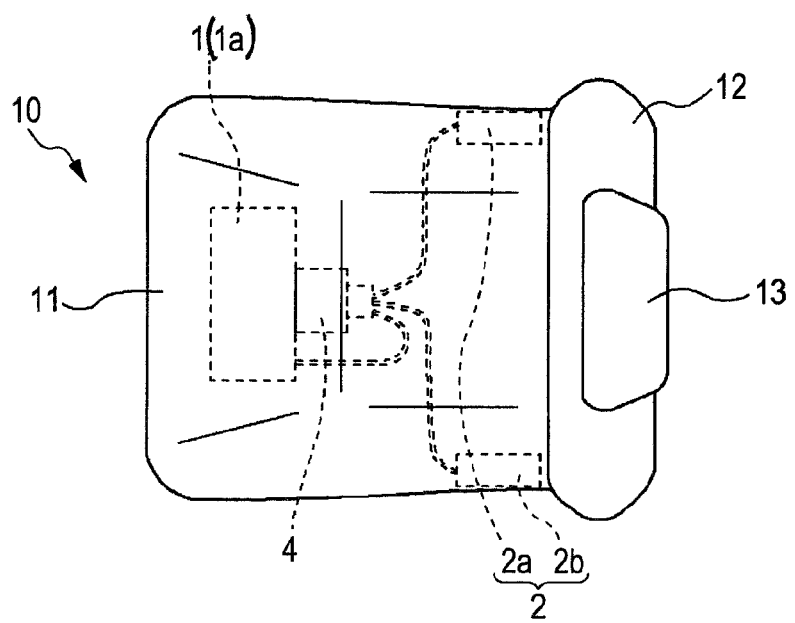

FIGS. 1A and 1B are block diagrams of a vehicle occupant discriminating apparatus according to the present invention showing its setting conformation, as an example. A vehicle seat 10 includes a seat 11 for accommodating an occupant thereon, a seat back 12, and a head rest 13. In an upper front interior portion of the seat 11, a switch sensor 1a is provided as state detecting means 1 and in a lower rear portion of the seat 11, load sensors 2a and 2b are provided as load measuring means 2. These load sensors 2a and 2b, as shown in FIG. 1B, are provided in a lower portion of the seat 11 as a lateral pair. In a lower portion of the seat 11, an electronic control unit 4 (referred to as ECU, below) is provided, to which the switch sensor 1a and the load sensors 2a and 2b are connected.

Figure 2:
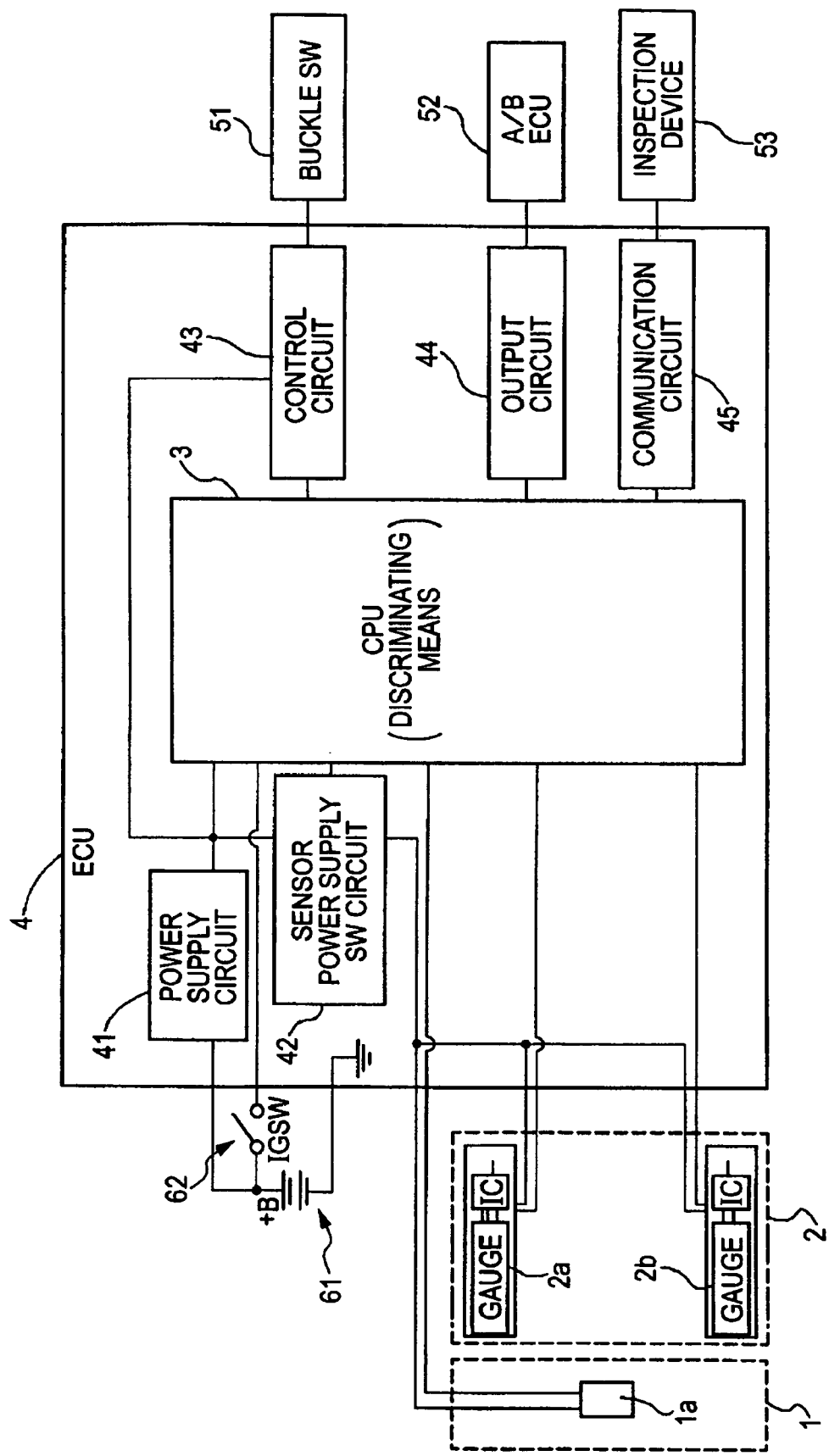
FIG. 2 is a block diagram of a system configuration of the vehicle occupant discriminating apparatus according to the present invention.

FIG. 2 is a block diagram of a system configuration of the vehicle occupant discriminating apparatus according to the present invention. As shown in FIG. 2, the ECU 4 includes a power supply circuit 41, a sensor power supply switch (SW) circuit 42, a CPU 3 as discriminating means, a control circuit 43, an output circuit 44, and a communication circuit 45. To the ECU 4, a voltage B (about 12V in a general vehicle) is applied from a battery 61. Treatments, such as voltage transformation and noise rejection, are applied to this voltage, which is then input in the CPU 3. To the CPU 3, a general semiconductor IC operation voltage, such as 5V or 3.3V, is applied. Also, to the CPU 3, an on/off signal of an ignition switch (IGSW) is input so that the operation state of the vehicle can be detected. Well-known resistance voltage division has been performed on this on/off signal with a resistor (not shown) so that the signal is input in a CPU 6 at a suitable voltage.

The sensor power supply SW circuit 42 is for supplying power to the switch sensor 1a and the load sensors 2a and 2b. As is apparent from the drawing, the power supplying to these sensors is controlled by the CPU 3. For example, the CPU 3 supplies power to these sensors at predetermined time intervals, and receives detected and measured results. Details will be described later; the occupant is discriminated on the basis of the detected and measured results received.

The switch sensor 1a is for detecting the turning on/off according to the embodiment. It may be a mechanical switch which turns on when an occupant is sitting above the switch sensor 1a in the seat 11 or it may be a switch for detecting the occupant by changes in electrostatic capacitance. Alternatively, the state detecting means 1 may be achieved by an optical sensor for observing the front of the seat 11, or by a visual sensor with image processing. According to the embodiment, the switch sensor 1a will be described below as the state detecting means 1 for detecting the turning on/off, and in the drawings, it will be referred to as "the on/off sensor".

The load sensors 2a and 2b are sensor units including a train gauge and a signal processing IC. Alternatively, in that only the strain gauge may be arranged in the lower portion of the seat 11 and the signal processing may be performed in the ECU 4. According to the embodiment, the load sensors 2a and 2b will be described as the load measuring means 2.

The output circuit 44 is for outputting a control signal to an airbag (A/B) ECU 52 on the basis of the discriminated result of an occupant by the CPU 3. For example, it outputs the control signal that the inflation is suppressed if the seat is vacant even in an emergency, and it is differentiated depending on the occupant being whether an adult or a child. Alternatively, while the CPU 3 may output only the discriminated result via the output circuit 44, the above-mentioned various controls may be executed by the airbag ECU 52 on the basis of the discriminated result.

The control circuit 43 is for determining whether the seatbelt is precisely worn or not, and the determined result is input in the CPU 3. This determination is performed on the basis of the result detected by the buckle switch (SW) 51. If the seatbelt is not precisely worn, if it is not worn, for example, it may occasionally be preferable not to inflate the airbag even in an emergency. In such a case, the CPU 3 feeds the control signal for suppressing the airbag inflation to the airbag ECU 52 via the output circuit 44. Alternatively, the information that the airbag is not worn is fed to the airbag ECU 52, and the control based on this information may be executed by the airbag ECU 52.

The communication circuit 45 is an interface for calibrating the load measuring means 2 and the state detecting means 1 in a factory, a dealer, and a repair shop. For precise occupant discrimination, accuracies in the load measuring means 2 and the state detecting means 1 are important. In particular, according to the embodiment, the load measuring means 2 utilizes a load sensor using a strain gauge, so that the reference load (so-called zero-point load) may vary. Thus, upon shipping, inspecting, or repairing of a vehicle, the adjustment or calibration is performed by connecting it to an inspection device 53. The communication circuit 45 is an interface circuit to the inspection device 53.

First Embodiment of Occupant Discrimination

A first embodiment of the occupant discrimination will be described below with reference to FIGS. 3A to 6. FIGS. 3A to 3E are drawings illustrating the principle for discriminating an occupant sitting on the vehicle seat 10 on the basis of discrimination conditions differing corresponding to the result detected by the state detecting means 1, and the result measured by the load measuring means 2, wherein FIG. 3A shows an adult sitting in a normal posture. In the normal posture, the switch sensor 1*a* (the state detecting means 1) exists below the upper thigh of the occupant so as to detect the presence of the occupant, i.e., to be turned on. The load sensors 2*a* and 2*b* (the load measuring means 2) provided in a lower portion of the seat 11 substantially precisely measures the weight of the occupant.

FIG. 3B shows a child sitting in a normal posture. In the normal posture, the switch sensor 1*a* (the state detecting means 1) exists below the feet of the occupant so as to detect the presence of the occupant, i.e., to be turned-on. The load sensors 2*a* and 2*b* (the load measuring means 2) provided in a lower portion of the seat 11 substantially precisely measures the weight of the occupant.

FIG. 3C shows the relationship between the load measured by the load sensors 2*a* and 2*b* and the discrimination conditions. Loads due to general adults are distributed on the larger side of measured loads while loads due to children are distributed on the smaller side of measured loads. Then, if a threshold value A (first discrimination condition) is set between the distributions, an occupant can be determined to be an adult or a child.

FIG. 3D shows a situation of a child standing on the vehicle seat 10. In this posture, the switch sensor 1*a* (the state detecting means 1) is separated from the occupant so as not to detect the presence of the occupant, i.e., to be turned off. Since the load of the child is concentrated to the rear of the seat 11, the load sensors 2*a* and 2*b* inflate the weight of the occupant.

FIG. 3E shows the relationship between the load measured by the load sensors 2*a* and 2*b* and the discrimination conditions. In view of also the case where a child is standing on the seat 11 as mentioned above, the distribution of the loads extends to the region shown by oblique lines of FIG. 3E. Within the extended region, loads larger than the above-mentioned threshold value A (first discrimination condition) are included. Hence, even if the occupant on the vehicle seat 10 is a child, the CPU 3 (discriminating means) determines the occupant to be an adult. For preventing this, an occupant is discriminated on the basis of a threshold value B (second discrimination condition) larger than the first discrimination condition. The switching between the first discrimination condition and the second discrimination condition is performed on the basis of the result detected by the switch sensor 1*a* (the state detecting means 1).

Figure 4:
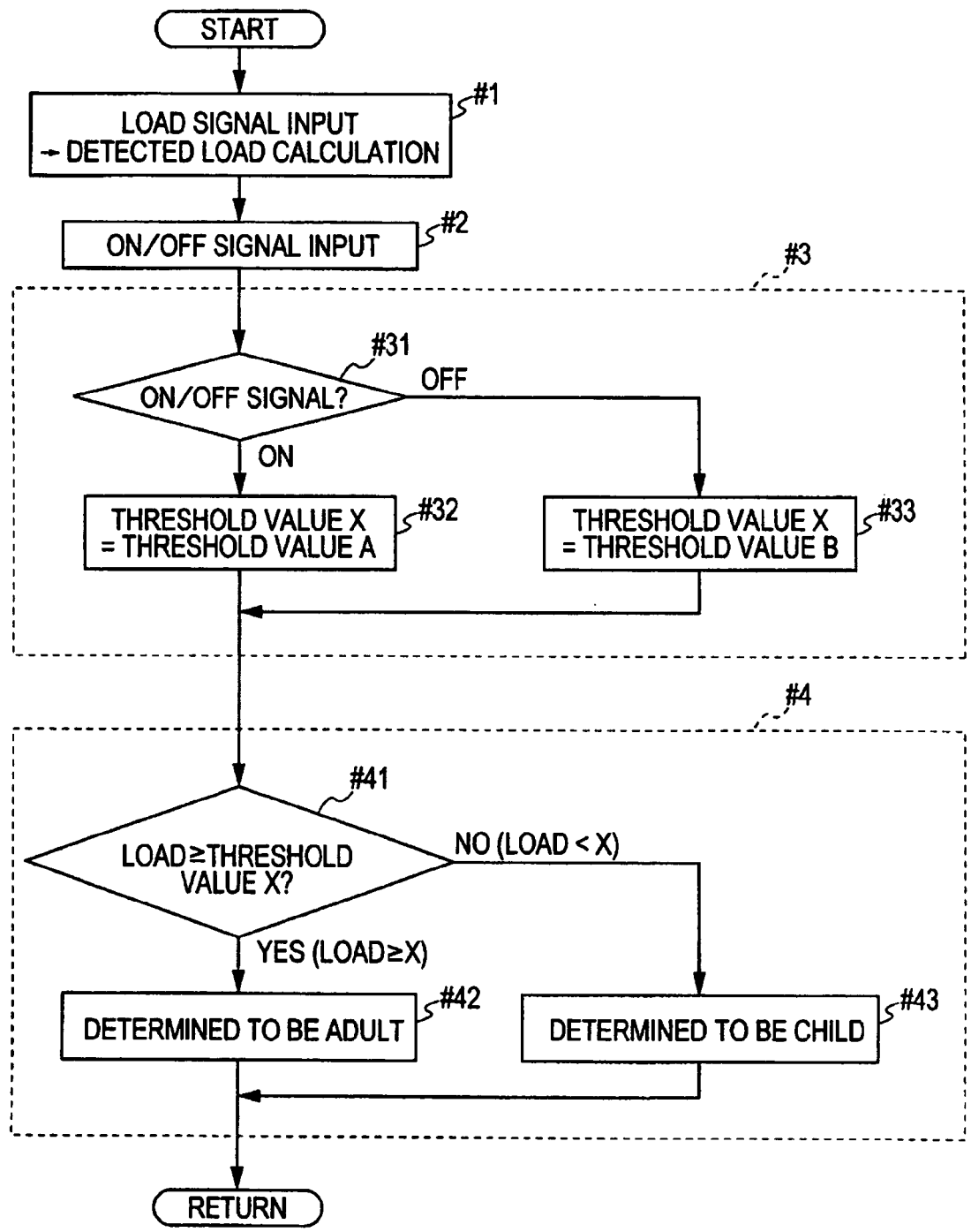
FIG. 4 is a flowchart showing an example procedure for discriminating an occupant on the basis of the discrimination condition differing corresponding to the result detected by state detecting means and the result measured by load measuring means.

FIG. 4 is a flowchart showing an example procedure for discriminating an occupant on the basis of the discrimination condition differing corresponding to the result detected by state detecting means, and the result measured by load measuring means. The CPU 3 receives the load measured results from the load sensors 2*a* and 2*b* so as to calculate the total load, i.e., the detected load (#1). The CPU 3 further receives an on- or off-signal from the switch sensor 1*a* (#2), and then, the received on- or off-signal is determined (#31). If the input from the switch sensor 1*a* is on, the occupant is determined to be the normal posture corresponding to FIG. 3A or FIG. 3B, a threshold value A (first discrimination condition) is set as a threshold value X (#32). On the contrary, if the input from the switch sensor 1*a* is off, a threshold value B (second discrimination condition) is set as the threshold value X (#33). Then, on the basis of the established threshold value X, the detected value (total value) calculated at #1 is evaluated (#41). When the load is larger than the threshold value X, the occupant is determined to be an adult (#42); when the load is less than the threshold value X, the occupant is determined to be a child (#43), so as to discriminate the occupant on the basis of the evaluated result.

Figure 5:
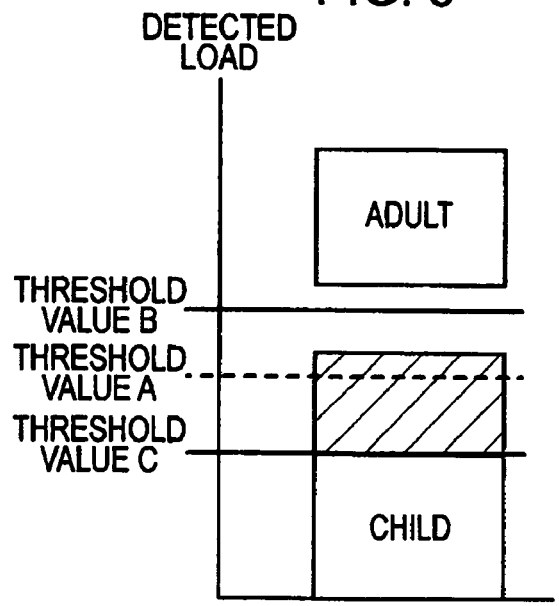
FIG. 5 is a drawing showing the relationship between the load measured by load measuring means and the discrimination condition.

In such a manner, on the basis of the first and second discrimination conditions established corresponding to the result detected by the state detecting means 1, and the result measured by the load measuring means 2, an occupant is discriminated. When the result measured by the load measuring means (the detected value, the total value) fluctuates in the vicinity of the boundary between the discrimination conditions, the determination is frequently switched, so that the discriminated result is also switched. Thus, a threshold value C (third discrimination condition) is provided as shown in FIG. 5. The threshold value C is further lower than the threshold value A for the case where an occupant is in a normal posture. The threshold value C is a discrimination condition used when the load varies from the larger side to the smaller side. That is, the occupant is discriminated on the basis of the discrimination conditions different from each other, which are the threshold value A or B for use when the result measured by the load measuring means 2 varies from the smaller side to the larger side, and the threshold value C for use when the load varies from the larger side to the smaller side.

Figure 6:
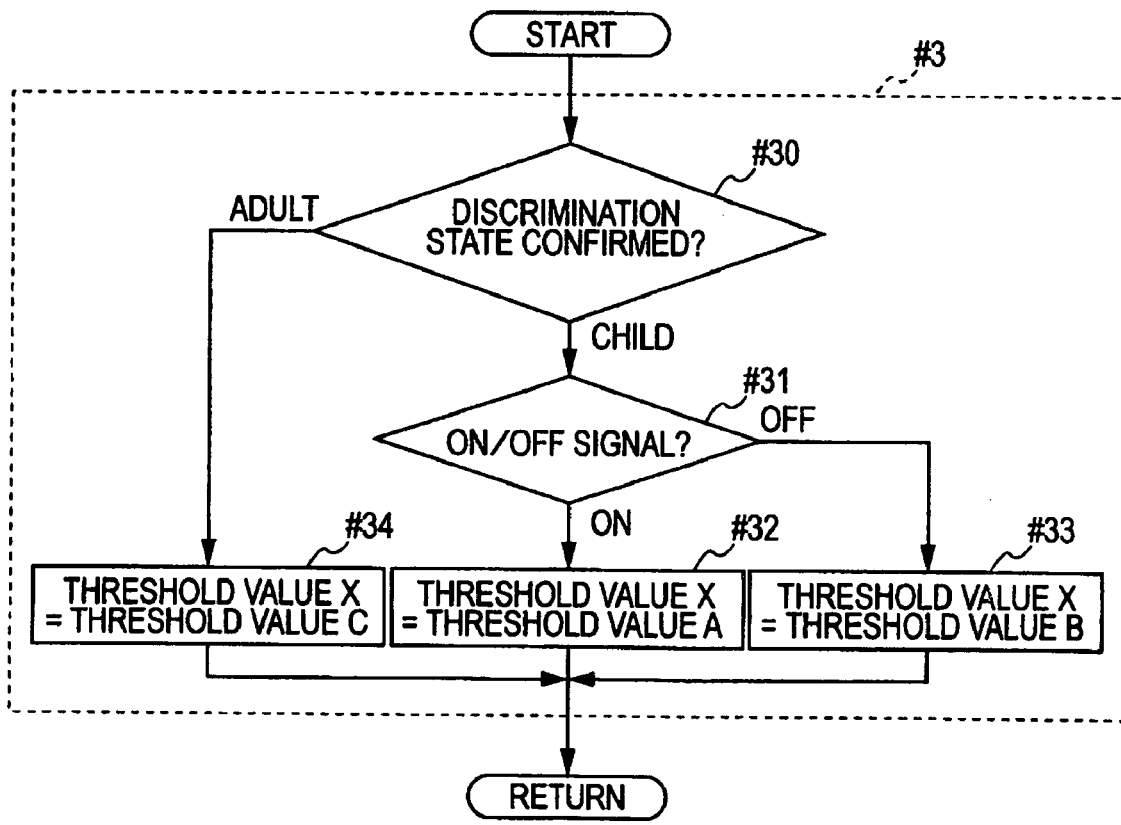
FIG. 6 is a flowchart showing an example procedure for discriminating an occupant on the basis of the discrimination conditions different from each other, which are cases when the measured result varies from the smaller side to the larger side, and when the load varies from the larger side to the smaller side.

FIG. 6 is a flowchart showing an example procedure for discriminating an occupant on the basis of the discrimination conditions different from each other, which are cases when the measured result (detected load) varies from the smaller side to the larger side, and when the load varies from the larger side to the smaller side. This is similar to the flowchart of FIG. 4, so that only the different process #3 is shown. Differently from the flowchart of FIG. 4, before the on/off of the result detected by the switch sensor 1*a* is determined (#31), the former discrimination state is confirmed (#30). When the former discrimination state is "adult", the load has been larger than the threshold value X established to be the threshold value A or B. Accordingly, the threshold value C is set as the threshold value X so as not to be easily less than the threshold value X (#34). When the former discrimination state is confirmed that the occupant is "child" at #30, the load has been less than the threshold value X set at the threshold value A, B, or C. Then, on the basis of the result of the occupant sitting state detected by the switch sensor 1*a* (#31), the threshold value A or B is set as the threshold value X in the same way as in the description with reference to FIG. 4 (#32, #33).

Second Embodiment of Occupant Discrimination

Figure 7:
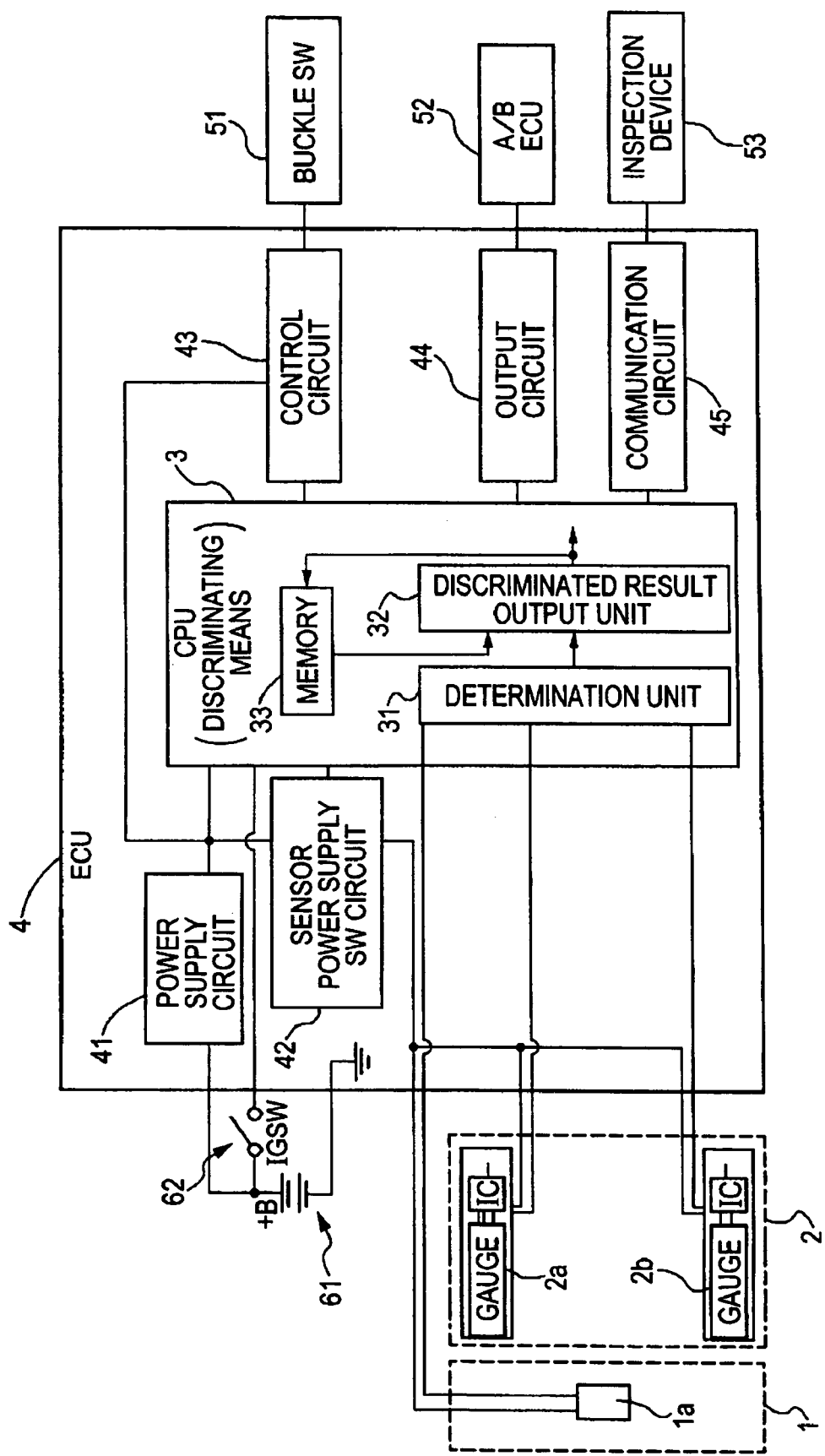
FIG. 7 is a supplementary block diagram of the system configuration of the vehicle occupant discriminating apparatus according to the present invention.

A second embodiment of the occupant discrimination will be described below with reference to FIGS. 8A to 17. In advance to the description of the second embodiment, the system configuration shown in FIG. 2 will be supplemented with reference to FIG. 7. As shown in FIG. 7, the CPU 3 (discriminating means) includes a determination unit 31 for determining whether the measured result is larger or smaller on the basis of the discrimination condition, a discriminated result output unit 32 for outputting the discriminated result of an occupant on the basis of the result determined by the determination unit 31, and a memory 33 for storing the discriminated result. The discriminated result output unit 32 discriminates the occupant on the basis of the discriminated result stored in the memory 33, i.e., the former discriminated result (the formerly discriminated occupant kind) and the result determined by the determination unit 31. That is, the CPU 3 (discriminating means) having these units discriminates the occupant on the basis of a predetermined discrimination condition, the result measured by the load measuring means, and the former discrimination result.

FIGS. 8A to 8G are drawings illustrating a first case for discriminating an occupant on the basis of the former discriminated result, the result detected by the state detecting means, and the result measured by the load measuring means, wherein FIG. 8A shows an adult sitting on the vehicle seat 10 in a normal posture. In the normal posture, the switch sensor 1a (the state detecting means 1, the on/off sensor) exists below the upper thigh of the occupant so as to detect the presence of the occupant, i.e., to be turned on. The load sensors 2a and 2b (the load measuring means 2) provided in a lower portion of the seat 11 substantially precisely measures the weight of the occupant. Loads due to general adults are distributed on the larger side of measured loads while loads due to children are distributed on the smaller side of measured loads. Then, if a threshold value X (discrimination condition) is set between the distributions, as shown in FIG. 8B, the occupant can be determined to be an adult or a child. In the case shown in FIG. 8A, the load of the adult occupant is large as shown by arrow "a" of FIG. 8B, the occupant is determined to be "adult" by the determination unit 31. This is output from the discriminated result output unit 32 as the discriminated result.

Determined results used by the discriminated result output unit 32 are shown in FIG. 8C as a matrix between the determined results whether an adult or a child by the determination unit 31 and the results detected by the switch sensor 1a. Since the result detected by the switch sensor 1a is "ON" and "Adult", the corresponding position is surrounded by a thick frame and symbolized by "○".

A case is supposed herein in that the kind determined by the determination unit 31 (the former discriminated result), i.e., "adult" changes to the different kind "child". FIG. 8D shows that the occupant tends to slightly stoop from the normal sitting posture shown in FIG. 8A. Since the load applied to the rear of the seat 11 decreases in this case, the load measured by the load sensors 2a and 2b is reduced. That is, the load varies corresponding to the change in occupant posture. As a result, the load becomes arrow "d" of FIG. 8F, so that the load is reduced lower than the threshold value X although the occupant is an adult, and the occupant might be determined to be "child" differently from the kind before the load change. Although the same thing is resulted when the occupant is instantaneously switched from an adult to a child as shown from FIG. 8A to FIG. 8E, in general, the occupant is not instantaneously switched, so that this case may not be supposed.

By the supposition mentioned above, when the former discriminated result stored in the memory 33 (the determined result by the determination unit 31, i.e., the kind discriminated before the load change) is "adult" in "on" state of the switch sensor 1a (the state detecting means 1), the CPU 3 (discriminating means 3) discriminates the occupant as follows. Even if the result determined by the determination unit 31 is "child" corresponding to the change in measured result by the load sensors 2a and 2b (the load measuring means 2), this is not output as the discriminated result. That is, the discriminated result output unit 32 outputs the former discriminated result stored in the memory 33 (the kind discriminated before the load change) as the discriminated result (see FIGS. 8C and 8G). As a result, the stored former discriminated result is maintained.

FIGS. 9A to 9F are drawings illustrating a second case for discriminating an occupant on the basis of the former discriminated result, the result detected by the state detecting means, and the result measured by the load measuring means, wherein FIG. 9A shows a child standing up on the vehicle seat 10. In this posture, the child body does not exist on the switch sensor 1a (the state detecting means 1) so as to turn the switch sensor 1a off. Also, in the posture of FIG. 9A, the occupant does not ride on the rear of the seat 11. Hence, the load sensors 2a and 2b (the load measuring means 2) provided in the lower portion of the seat 11 measures a load larger than that of an occupant in a normal posture (arrow "a" of FIG. 9B); however it does not exceed the threshold value X. As a result, as shown in FIGS. 9B and 9C, the occupant kind is discriminated in favor of "child".

A case is supposed herein in that the kind determined (discriminated) by the determination unit 31 that is "child" changes to the different kind "adult". FIG. 9D shows that the occupant comes to one's feet on the seat 11 from the posture of FIG. 9A. Since the load applied to the rear of the seat 11 increases in this case, the load measured by the load sensors 2a and 2b is increased. As a result, the load becomes arrow "d" of FIG. 9E, so that the load is increased higher than the threshold value X, and although the occupant is a child, the occupant might be determined to be "adult".

By the supposition mentioned above, when the former discriminated result stored in the memory 33 (the determined result by the determination unit 31) is "child" in "OFF" state of the switch sensor 1a (the state detecting means 1), the CPU 3 (discriminating means 3) discriminates the occupant as follows. Even if the result determined by the determination unit 31 is "adult" corresponding to the change in measured result by the load sensors 2a and 2b (the load measuring means 2), this is not output as the discriminated result. That is, the discriminated result output unit 32 outputs the former discriminated result stored in the memory 33 (the kind discriminated before the load change) as the discriminated result (see FIGS. 9C and 9F). As a result, the stored former discriminated result is maintained.

FIGS. 10A to 10G are drawings illustrating a third case for discriminating an occupant on the basis of the former discriminated result, the result detected by the state detecting means, and the result measured by the load measuring means, wherein FIG. 10A shows that the adult occupant tends to slightly stoop from the normal sitting posture. In this posture, the switch sensor 1a (the state detecting means 1) exists below the upper thigh of the occupant so as to detect the presence of the occupant, i.e., to be turned on. On the other hand, since the center of gravity is positioned at the front, the load applied to the rear of the seat 11 is measured to be smaller than the actual load due to the occupant. As a result, the load becomes arrow "a" of FIG. 10C, so that the load is reduced lower than the threshold value X and the occupant might be determined to be "child" although the occupant is an adult. When a child occupant is sitting in a normal sitting posture, the load becomes arrow "b" of FIG. 10C as a matter of course, so that the load is reduced lower than the threshold value X and the occupant is precisely determined to be "child". The former case is shown in FIG. 1C, and since the determined (discriminated) kind of the occupant is different from an actual one, the load is shown by a dotted line.

A case is supposed herein in that the kind determined by the determination unit 31 that is "child" changes to the different kind "adult". FIG. 10E shows that the adult occupant returns to the normal posture from the posture of FIG. 10A. In this case, the load varies corresponding to the change in occupant posture. That is, since the load applied to the rear of the seat 11 increases, the load measured by the load sensors 2a and 2b is increased. As a result, the load becomes arrow "e" of FIG. 10F, so that the load is increased higher than the threshold value X, and the occupant is precisely determined to be "adult". In addition, an adult sitting in a normal posture does generally not stand up (the result detected by the switch sensor 1a does not vary), so that the load increase is difficult to be assumed, and this is not considered in this case.

By the supposition mentioned above, when the former discriminated result stored in the memory 33 (the determined result by the determination unit 31) is "child" in "ON" state of the switch sensor 1a (the state detecting means 1), the CPU 3 (discriminating means 3) discriminates the occupant as follows. If the result determined by the determination unit 31 is "adult" corresponding to the change in measured result by the load sensors 2a and 2b (the load measuring means 2), this is adopted as the precise discriminated result. That is, the discriminated result output unit 32 outputs the kind different from the former discriminated result stored in the memory 33 (the kind discriminated before the load change) as the discriminated result (see FIGS. 10D and 10G).

FIGS. 11A to 11F are drawings illustrating a fourth case for discriminating an occupant on the basis of the former discriminated result, the result detected by the state detecting means, and the result measured by the load measuring means, wherein FIG. 11A shows a child standing up on the seat 11 of the vehicle seat 10. In this posture, the child body does not exist on the switch sensor 1a (the state detecting means 1) so as to turn the switch sensor 1a off. The load sensors 2a and 2b measures the load applied to the rear of the seat 11 larger than the weight of the child occupant. As a result, the load becomes arrow "a" of FIG. 11B, so that the load is increased larger than the threshold value X and the occupant might be determined to be "adult" although the occupant is a child. Since the determined (discriminated) kind of the occupant is different from an actual one, the load is shown in FIG. 11C by a dotted line.

A case is supposed herein in that the kind determined by the determination unit 31 that is "adult" changes to the different kind "child". FIG. 11D shows that the child occupant crouches down on the seat 11 from the posture shown in FIG. 11A. In this case, the body of the child occupant does not yet exist on the switch sensor 1a (the state detecting means 1), so that the result detected by the switch sensor 1a is maintained in OFF state. However, since the load applied to the rear of the seat 11 decreases, the load measured by the load sensors 2a and 2b is also reduced. As a result, the load becomes arrow "d" of FIG. 11E, so that the load is reduced lower than the threshold value X, and the occupant is precisely determined to be "child".

By the supposition mentioned above, when the former discriminated result stored in the memory 33 (the determined result by the determination unit 31) is "adult" in "OFF" state of the switch sensor 1a (the state detecting means 1), the CPU 3 (discriminating means 3) discriminates the occupant as follows. If the result determined by the determination unit 31 is "child" corresponding to the change in measured result by the load sensors 2a and 2b (the load measuring means 2), this is adopted as the precise discriminated result. That is, the discriminated result output unit 32 outputs the kind different from the former discriminated result stored in the memory 33 (the kind discriminated before the load change) as the discriminated result (see FIGS. 11C and 11F).

With reference to FIGS. 8A to 11F, four cases according to the second embodiment of the occupant discrimination have been described. These are described in that how the discriminating means 3 discriminates an occupant when the kind of the occupant discriminated on the basis of the discrimination condition that differs from that before load change corresponding to the load change due to changes in occupant sitting posture. That is, when the determined result by the determination unit 31 varies in accordance with the change in result measured by the load measuring means 2, ways of the discriminated result output unit 32 to output are described. As described above, by the selection whether the kind before the load change (the former discriminated result) is held (maintained) or not on the basis of the kind before the load change and the result detected by the state detecting means 1, the preferable discrimination of the occupant kind is achieved.

In the above-description, "being held" means that the former discriminated result (the kind before load change) is continuously held in the memory 33 while "being maintained" means that the output of the discriminated result output unit 32 follows the former discriminated result (the kind before load change). Hence, the difference between "being held" and "being maintained" is that of the action extent in the interior of the discriminating means 3, and there is no large difference in the vehicle occupant discriminating apparatus. This is similar to between "determination" and "discrimination". For expressing the difference of the action extent in the interior of the discriminating means 3, "determination" is used for the action of the determination unit 31 in the discriminating means 3 and "discrimination" is used for the action in the entire discriminating means 3. However, there is no large difference in the vehicle occupant discriminating apparatus.

In the above-description with reference to FIGS. 8A to 11F, the selection is controlled whether the kind before the load change (the former discriminated result) is held (maintained) or not. Alternatively, by setting a predetermined duration time, the former discriminated result may be maintained for the duration time so as to have the same effect. For example, if the predetermined duration time is set to be infinite, the former discriminated result is maintained as shown in FIGS. 8A to 9F. If it is set to be zero, the former discriminated result is not maintained as shown in FIGS. 10A to 11F. Then, if the former discriminated result is maintained for a predetermined time, the duration time can be set between the infinite and zero, so that the control range may preferably be extended.

With reference to FIGS. 12A to 15F, cases will be described below in that the discriminating means 3 maintains the former discriminated result for a predetermined time established on the basis of the former discrimination result stored in the memory 33 (the kind before the load change) and the result detected by the state detecting means 1. As for occupant postures, FIGS. 8A to 8G are equivalent to FIGS. 12A to 12G; FIGS. 9A to 9F to FIGS. 13A to 13F; FIGS. 10A to 10G to FIGS. 14A to 14G; and FIGS. 11A to 11F to FIGS. 15A to 15F.

FIGS. 12A to 12G are drawings for illustrating a first case in that the occupant is discriminated by maintaining the former discrimination result for a predetermined time established on the basis of the former discrimination result and the result detected by the state detecting means 1. FIGS. 12A to 12C for illustrating the former discrimination result and FIGS. 12D and 12E for illustrating the newly determined result by the determination unit 31 corresponding to the change in occupant posture are the same as FIGS. 8A to 8E, so that the description thereof is omitted.

A case is supposed herein in that the kind determined by the determination unit 31 that is "adult" changes to the different kind "child" by recognizing the load change detected by the load measuring means 2 (the load change corresponding to the change in occupant posture). The solid line of the graph in FIG. 12G shows changes in load measured by the load measuring means 2. When the posture varies from the normal posture to the slight stooping, the measured load is reduced lower than the threshold value X as shown by the solid line of FIG. 12G. Although the occupant is an adult, the occupant may be determined to be "child". However, such a stooping posture is not generally maintained for a long time, so that the occupant may be expected to return to the normal posture of FIG. 12A. That is, as shown by the dotted line of FIG. 12G, the occupant is expected determined to be "adult" by the again increase in load over the threshold value X.

When the former discriminated result stored in the memory 33 (the determined result by the determination unit 31) is "adult" in "ON" state of the switch sensor 1a (the state detecting means 1), the CPU 3 (discriminating means 3) discriminates the occupant as follows. Although if the result determined by the determination unit 31 is "child" corresponding to the change in measured result by the load sensors 2a and 2b (the load measuring means 2), the CPU 3 does not output this instantly as the discriminated result. That is, the discriminated result output unit 32 maintains the former discriminated result stored in the memory 33 (the kind discriminated before the load change) for a predetermined time t1. After the elapse of time t1, the determination is again performed by the determination unit 31, and the CPU 3 outputs the discrimination result on the basis of this result. After the elapse of time t1, if the occupant returns to the normal posture and the measured load is returned as the dotted line of FIG. 12G, the same discriminated result "adult" as the former discriminated result is output. The time t1 may be appropriately set on the basis of the human engineering or data, and it may be about 10 seconds, for example.

FIGS. 13A to 13E are drawings for illustrating a second case in that the occupant is discriminated by maintaining the former discrimination result for a predetermined time established on the basis of the former discrimination result and the result detected by the state detecting means 1. FIGS. 13A to 13E are the same as FIGS. 9A to 9E in contents, so that the description thereof is omitted.

In the same way as in FIG. 12A to 12G, with reference to FIG. 13F, a change in determined result by the determination unit 31 is supposed herein by recognizing the load change detected by the load measuring means 2. The solid line of the graph in FIG. 13F shows changes in load measured by the load measuring means 2. When the posture varies from the posture shown in FIG. 13A to the standing shown in FIG. 13D, the measured load is increased larger than the threshold value X as shown by the solid line of FIG. 13F. Although the occupant is a child, the occupant may be determined to be "adult". If the standing occupant returns to the posture of FIG. 13A or the normal posture before the elapse of predetermined time t2, the occupant is determined to be "child" by the again decrease in load below the threshold value X. It is preferable that the predetermined time t2 be longer than the recovery time from the stooping posture mentioned above, and it may be about 30 seconds to one minute, for example. However, it is not of course limited to these, the time t2 may be appropriately set on the basis of the human engineering, data, or experiments.

Figure 14D:
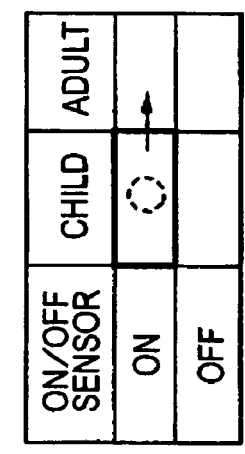
Figure 14G:
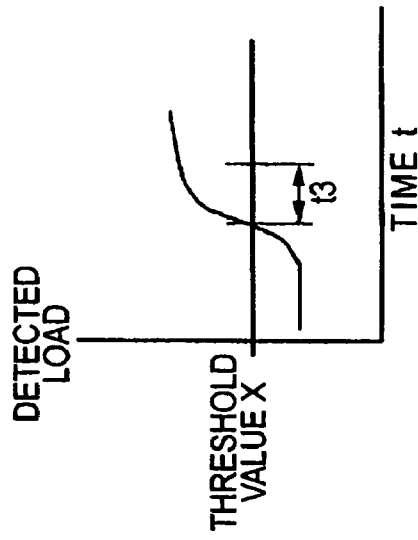
Figure 14C:
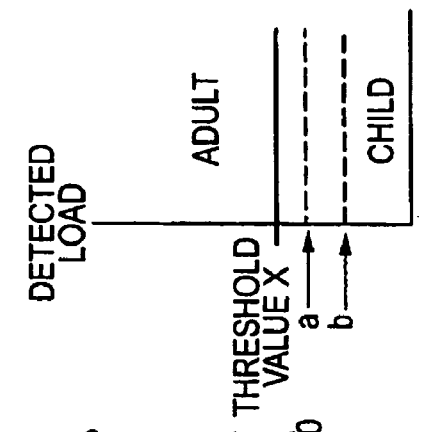
Figure 14F:
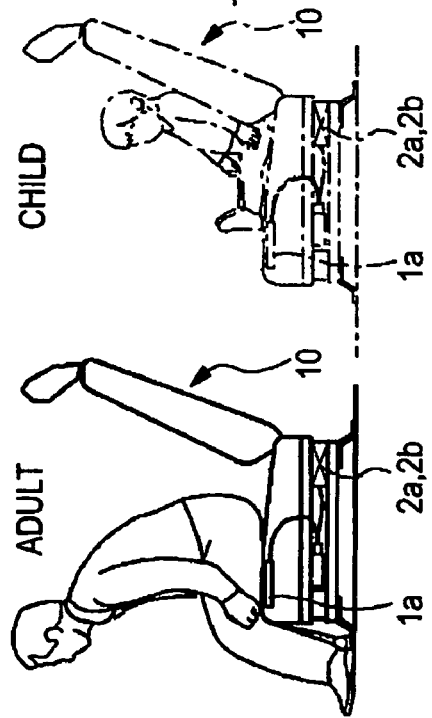

FIGS. 14A to 14G are drawings for illustrating a third case in that the occupant is discriminated by maintaining the former discrimination result for a predetermined time established on the basis of the former discrimination result and the result detected by the state detecting means 1. FIGS. 15A to 15F are drawings for illustrating a fourth case in that the occupant is discriminated by maintaining the former discrimination result for a predetermined time established on the basis of the former discrimination result and the result detected by the state detecting means 1. FIGS. 14A to 14F and FIGS. 15A to 15E are equivalent to FIGS. 10A to 10E and FIGS. 11A to 11E, respectively, so that the description thereof is omitted. In these cases, the former discrimination result is desirable to be promptly renewed as described with reference to FIGS. 10A to 10E and FIGS. 11A to 11E. Thus, when the discriminated result (the determination result by the determination unit 31) varies corresponding to the change in measured result by the load measuring means 2, the renewed determined result may directly be the discriminated result. When doing so, a predetermined time t3 shown in FIGS. 14G and 15F is to be zero. Alternatively, in view of fluctuations such as noise, it may be about 2 to 3 seconds.

Figure 17:
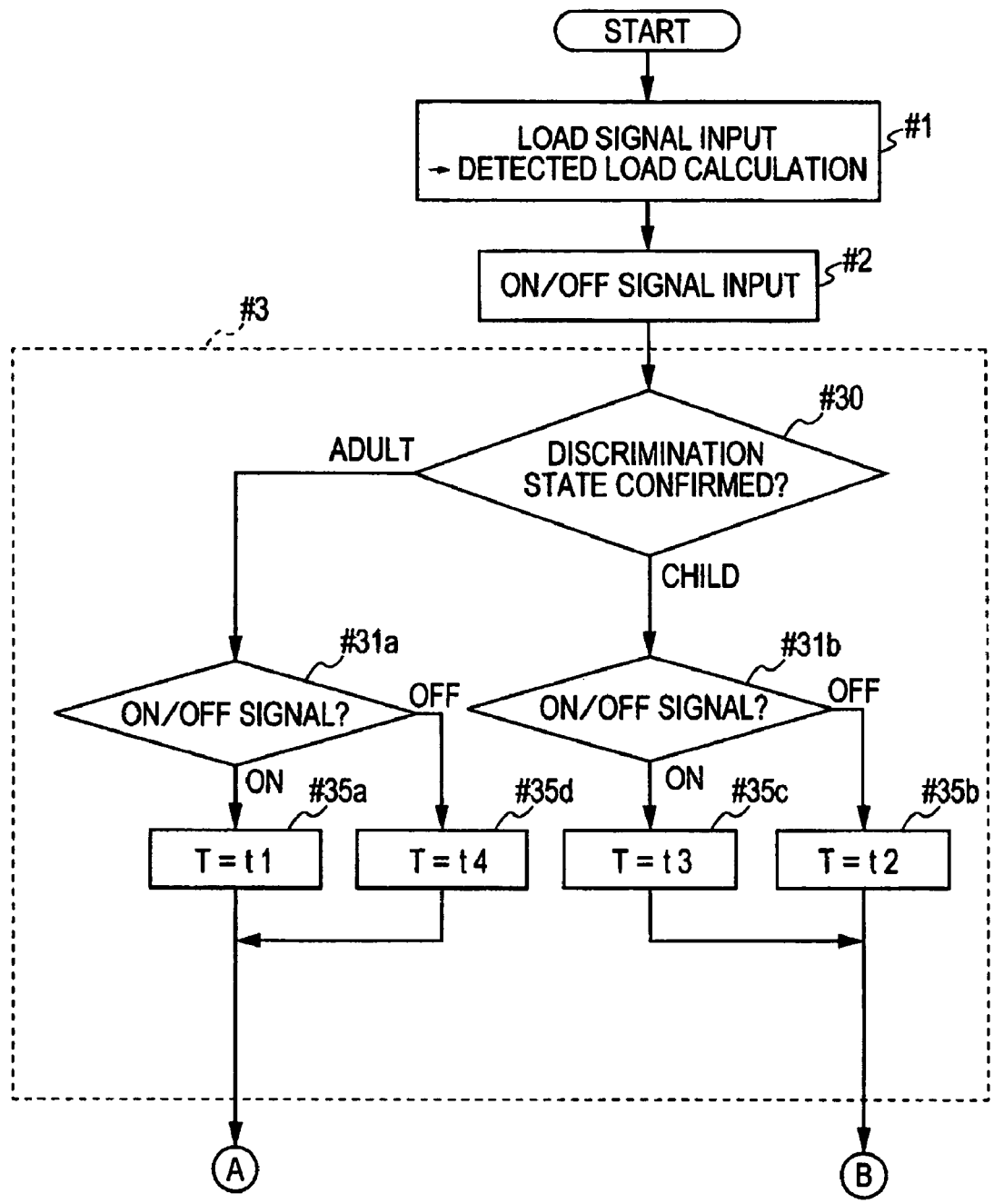
FIG. 17 is a flowchart showing an example procedure for discriminating an occupant by maintaining the former discrimination result for a predetermined time established on the basis of the former discriminated result and the result detected by state detecting means.
Figure 17B:
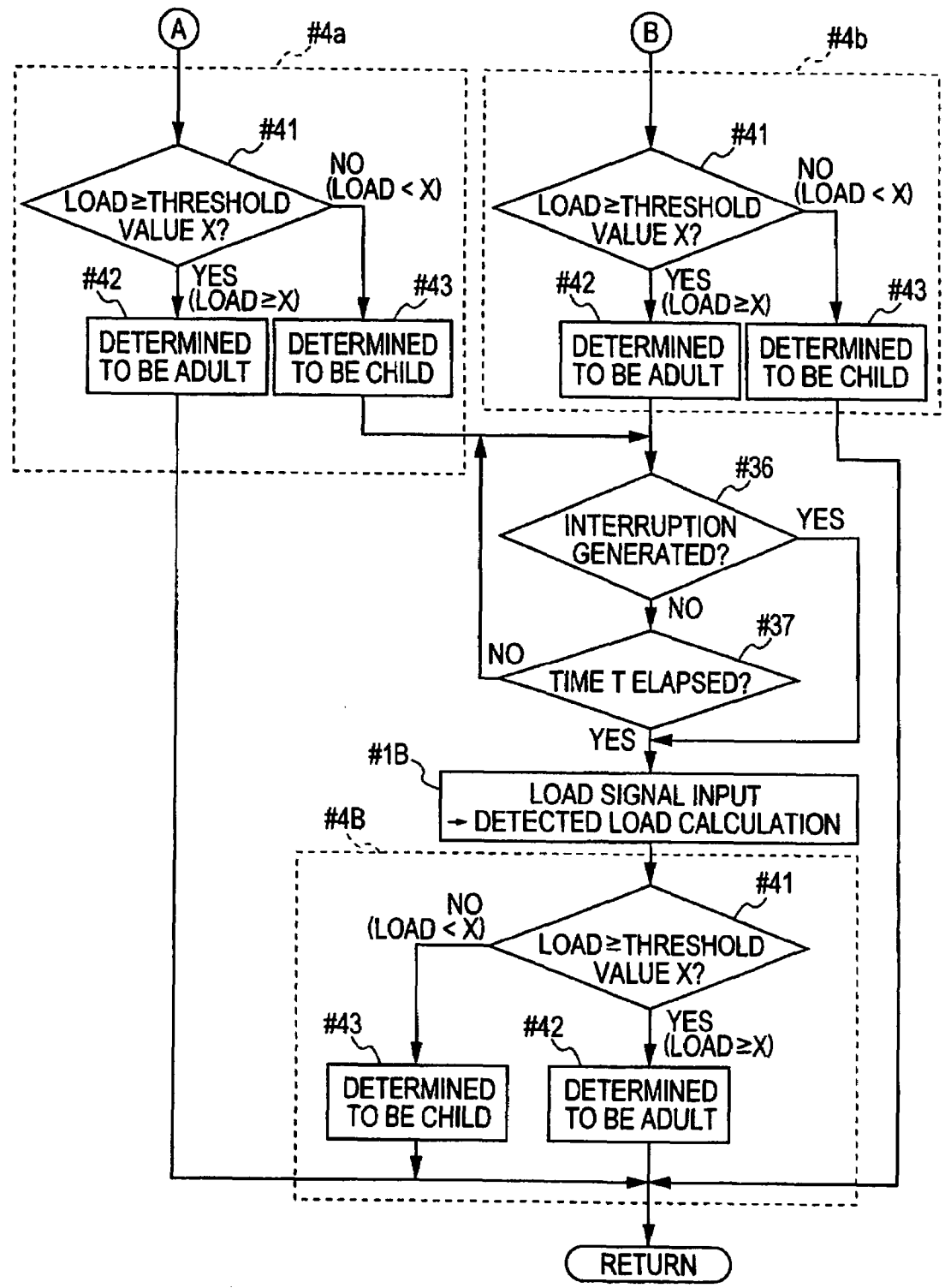

FIGS. 16 and 17 are flowcharts for illustrating occupant discrimination processes by the discriminating means 3 corresponding to the cases shown in FIGS. 8A to 11F and FIGS. 12A to 15F. The occupant discrimination process is executed by the CPU 3 (the discriminating means 3) of the block diagram in FIG. 7. Each unit included in the CPU 3 (indicated by numerals 31 to 33) takes part of the occupant discrimination processing. Each unit shears functional part and it is not necessarily independent physically. These units may be not only hardware such as a memory and a theoretical circuit but also software such as a program executed on the hardware.

FIG. 16 is a flowchart showing an example procedure for discriminating an occupant on the basis of the former discriminated result, the result detected by state detecting means 1, and the result measured by load measuring means 2. The CPU 3 receives the load measured results from the load sensors 2a and 2b so as to calculate the total load, i.e., the detected load (#1). The CPU 3 further receives an on- or off-signal from the switch sensor 1a (#2), and then, the former discrimination result (most recent discrimination state) is confirmed (#30). Then, by depending on whether the discrimination state is "adult" or "child", the received on- or off-signal is separately determined (#31a and #31b).

When the discrimination state is confirmed that the occupant is "adult" at #30, the on- or off-signal is determined at #31a. If it is the on-signal, the load calculated at #1 is not estimated and the process proceeds to #42 so as to maintain the discrimination result that is "adult" (corresponding to the case shown in FIGS. 8A to 8G). If it is the off-signal, the load calculated at #1 is estimated on the basis of the threshold value X (#41, and corresponding to the case of FIGS. 11A to 11F). If the load is more than the threshold value X, the occupant is determined to be "adult" (#42). If the load is less than the threshold value X, the occupant is determined to be "child" (#43). On the basis of any one of determined results, the vehicle occupant discrimination result is output.

When the discrimination state is confirmed that the occupant is "child" at #30, the on- or off-signal is determined at #31b. If it is the off-signal, the load calculated at #1 is not estimated and the process proceeds to #43 so as to maintain the discrimination result that is "child" (corresponding to the case shown in FIGS. 9A to 9F). If it is the on-signal, the load calculated at #1 is estimated on the basis of the threshold value X (#41, and corresponding to the case of FIGS. 10A to 10G). If the load is more than the threshold value X, the occupant is determined to be "adult" (#42). If the load is less than the threshold value X, the occupant is determined to be "child" (#43). On the basis of any one of determined results, the vehicle occupant discrimination result is output.

FIG. 17 is a flowchart showing an example procedure for discriminating an occupant by maintaining the former discrimination result for a predetermined time established on the basis of the former discriminated result and the result detected by state detecting means 1. The processes, such as calculation the load (#1), receiving an on- or off-signal from the switch sensor 1a (#2), and confirmation the former discrimination result stored in the memory 33 (#30), are the same as those described with reference to FIG. 16. Then, similarly, by depending on whether the discrimination state is "adult" or "child", the on- or off-signal received from the switch sensor 1a is separately determined (#31a and #31b).

When the discrimination state is confirmed that the occupant is "adult" at #30, the on- or off-signal is determined at #31a. If it is the on-signal, a time t1 is set as a predetermined time T (#35a). Then, the load calculated at #1 is estimated on the basis of the threshold value X (#41). If the load is more than the threshold value X, the occupant is determined to be "adult" (#42). Since this determined result is the same as the stored former discrimination result, the former discrimination result is maintained.

In the same way as in FIG. 16, the determination processing at #42 of #4B of FIG. 17 may be executed so as to output the discriminated result on the basis of this determination. In such a manner, detailed specific processing procedures may be suitably modified within the scope of the technical concept of the present invention.

On the other hand, if the load is less than the threshold value X, the occupant is determined to be "child" (#43). Since the kind is different from the former discriminated result in this case, the discrimination result is not renewed before the elapse of the predetermined time T (=t1) established previously at #37 so as to maintain the former discriminated result. For this duration, if a programmed interruption, such as switching of the input from the switch sensor 1a, is generated (#36), the process proceeds to the next one (#1B) before the elapse of the predetermined time T.

After the elapse of the predetermined time T (=t1) (#37), or after the interruption processing (#36), the load is freshly calculated (#1B). Under the apprehension that the determination result at #41 of the load calculated at #1 is used for discriminating the occupant, the elapse of the predetermined time T has been waited. Thus, the load after the elapse of the predetermined time T is freshly determined at #42 of #4B. These series of processing correspond to the case shown in FIGS. 12A to 12G.

On the other hand, in the determination whether the signal is on or off at #31a, if it is the off-signal, a time t4 is set as a predetermined time T (#35d). Then, the load calculated at #1 is estimated on the basis of the threshold value X (#41). If the load is less than the threshold value X, the occupant is determined to be a child (#42). Since the kind is different from the former discriminated result, after waiting the elapse of the predetermined time T previously set at #37 (T=t4, in this case), the load is estimated at #4B. In addition, the former discriminated result in this case might be preferably renewed promptly if it would be determined to be the different kind by the combination of the occupant kind with the result detected by the switch sensor 1a. Hence, the predetermined time t4 is reduced shorter than the above predetermined time t1 so as to put the re-estimation forward. The processing about the interruption generation (#36) is the same as described above.

After the elapse of the predetermined time T (=t4) (#37), or after the interruption processing (#36), the load is freshly calculated (#1B). Since the predetermined time T (=t4) is very short in this case, the using the load calculated at #1 is not so noticed. However, for eliminating noise effect, the load again calculated at #1B may be preferably used. Then, at #4B, the load calculated at #1 is estimated on the basis of the threshold value X (#41). When the load is larger than the threshold value X, the occupant is determined to be an adult (#42); and when the load is less than the threshold value X at #41, the occupant is determined to be a child (#43). These series of processing correspond to the case shown in FIGS. 15A to 15F.

When the discrimination state is confirmed that the occupant is "child" at #30, whether the signal is on or off is determined at #31b. If it is the off-signal, a time t2 is set as a predetermined time T (#35b). Then, the load calculated at #1 is estimated on the basis of the threshold value X (#41). If the load is less than the threshold value X, the occupant is determined to be a child (#43). Since this determined result is the same as the former discrimination result, the result is output as it is.

On the other hand, when the load is larger than the threshold value X at #41, the occupant is determined to be an adult (#42). Since the kind is different from the former discriminated result in this case, the discrimination result is not renewed before the elapse of the predetermined time T (=t2) established previously at #37 so as to maintain the former discriminated result. For this duration, if an interruption is generated (#36), the process proceeds to the next one (#1B) before the elapse of the predetermined time T.

After the elapse of the predetermined time T (=t2) (#37), or after the interruption processing (#36), the load is freshly calculated (#1B). Under the apprehension that the determination result at #41 of the load calculated at #1 is used for discriminating the occupant, the elapse of the predetermined time T has been waited. Thus, the load after the elapse of the predetermined time T is freshly determined at #41 of #4B. These series of processing correspond to the case shown in FIGS. 13A to 13F.

On the other hand, in the determination whether the signal is on or off at #31b, if it is the on-signal, a time t3 is set as a predetermined time T (#35c). Then, the load calculated at #1 is estimated on the basis of the threshold value X (#41). When the load is larger than the threshold value X, the occupant is determined to be an adult (#42). Since the kind is different from the former discriminated result in this case, after waiting the elapse of the predetermined time T previously set at #37 (T=t3, in this case), the load is estimated at #4B. In addition, the former discriminated result in this case might be preferably renewed promptly if it would be determined to be the different kind by the combination of the occupant kind with the result detected by the switch sensor 1a. Hence, the predetermined time t3 is reduced shorter than the above predetermined time t1 so as to put the re-estimation forward. In addition, the predetermined time t3 is shorter than the above-predetermined time t2 and is similar to the predetermined time t4. The processing about the interruption generation (#36) is also the same as described above.

After the elapse of the predetermined time T (=t3) (#37), or after the interruption processing (#36), the load is freshly calculated (#1B). Since the predetermined time T (=t3) is very short in the same way as in the predetermined time t4, the using the load calculated at #1 is not so noticed. However, for eliminating noise effect, the load again calculated at #1B may be preferably used. Then, at #4B, the load calculated at #1 is estimated on the basis of the threshold value X (#41). When the load is larger than the threshold value X, the occupant is determined to be an adult (#42); and when the load is less than the threshold value X at #41, the occupant is determined to be a child (#43). These series of processing correspond to the case shown in FIGS. 14A to 14G.

In addition, in the flowchart of FIG. 17, if t1/t2=an infinity and t3/t4=zero, the flowchart is equivalent to the flowchart shown in FIG. 16. Hence, the processing shown in FIG. 16 belongs to the technical range of FIG. 17, so that the processing may be one mode in the technical range.

Third Embodiment of Occupant Discrimination

The embodiment of the present invention has been described by dividing it into the first and second embodiments; alternatively, these embodiments may of course be integrated together. As for the system configuration, the first embodiment shown in FIG. 2 is substantially equivalent to the second embodiment shown in FIG. 7. Accordingly, if the processes shown in FIGS. 4, 6, and 17 are integrated, these processes may be easily executed by the determining means 3 in the system configuration shown in FIG. 7 (FIG. 2).

Figures 18, 18A:
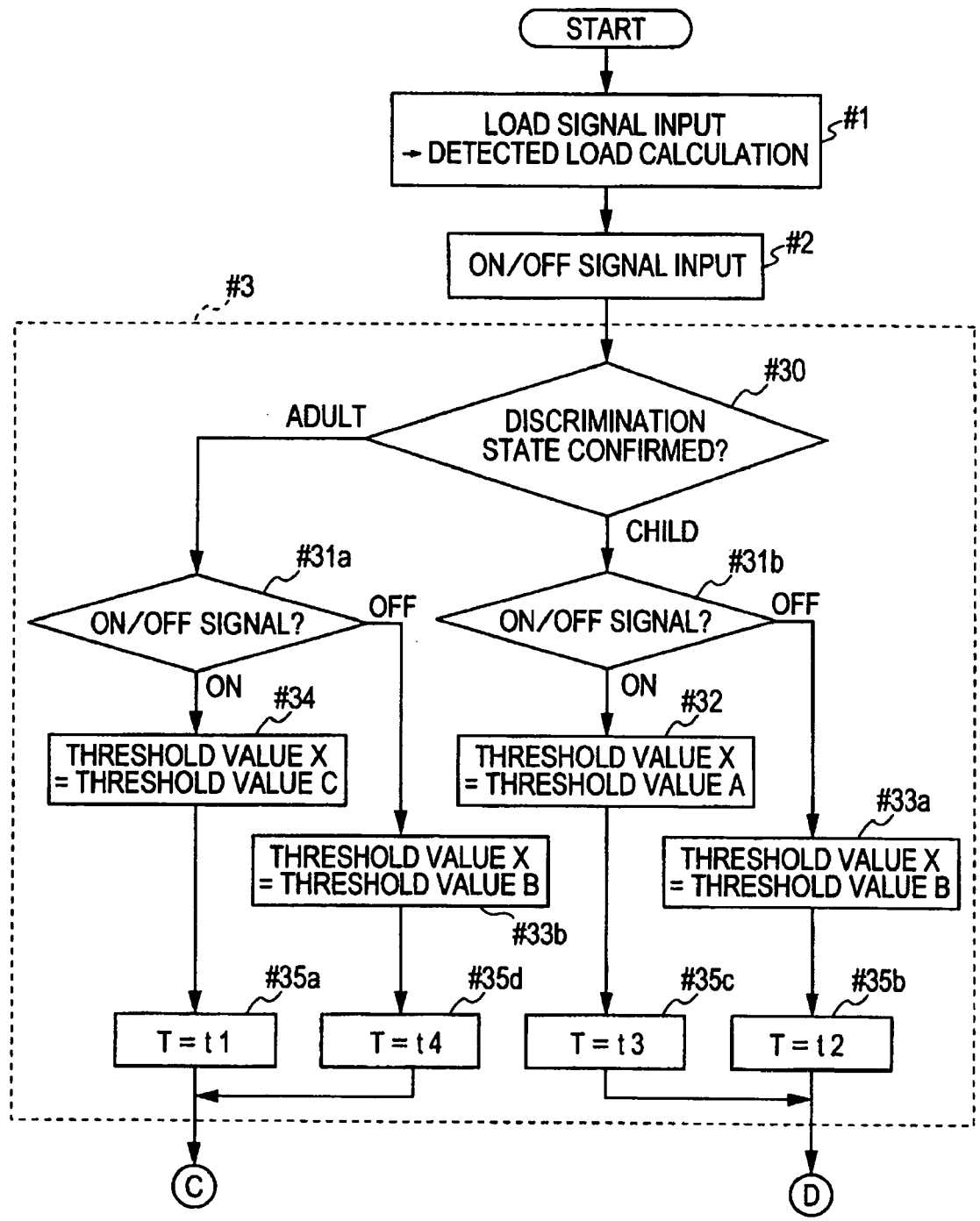
FIG. 18 is a flowchart showing an example procedure for discriminating an occupant through the process integrated with those shown FIGS. 4, 6, and 17.
Figure 18B:
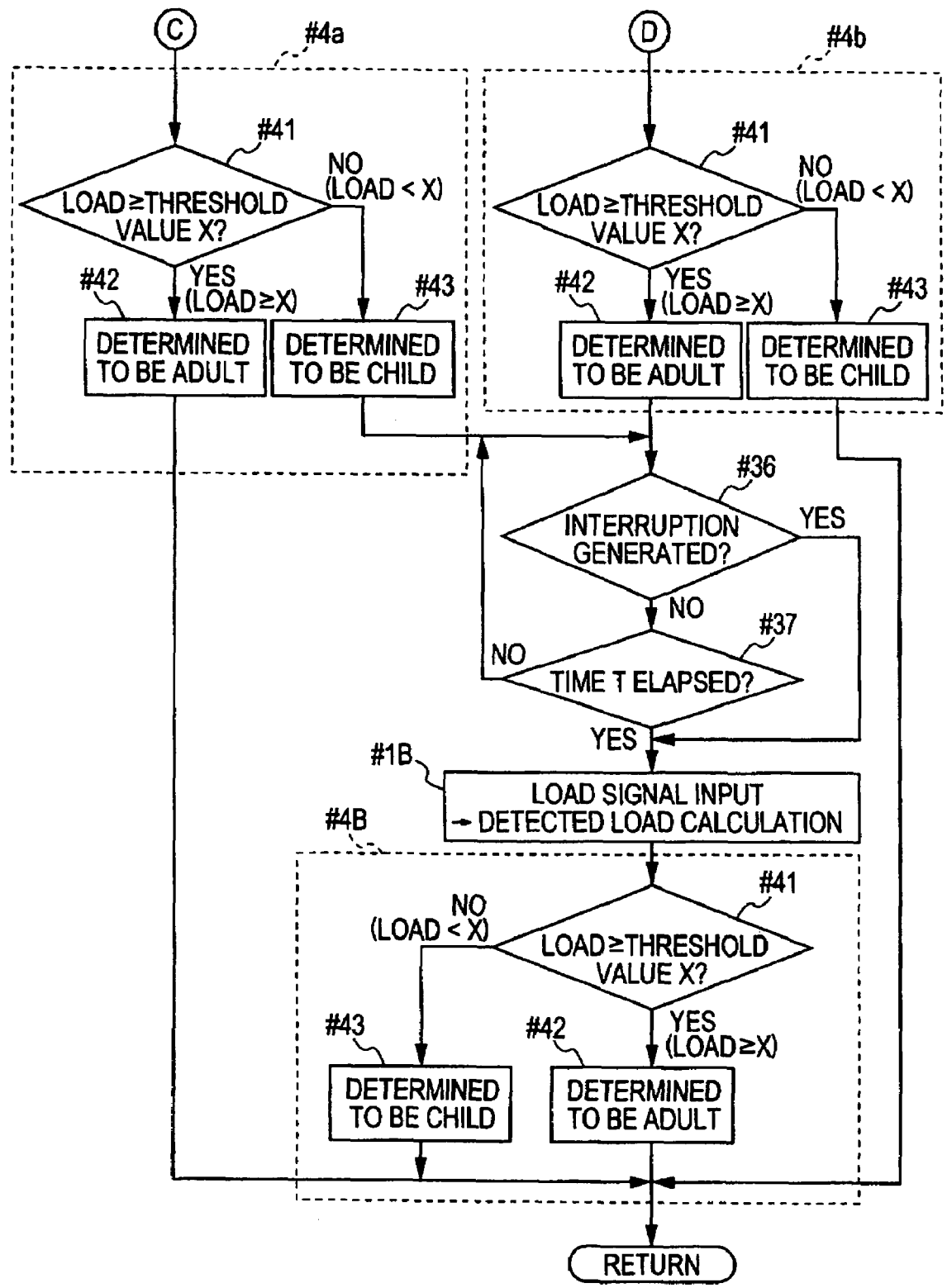

FIG. 18 is a flowchart showing an example procedure for discriminating an occupant through the process integrated with those shown FIGS. 4, 6, and 17. This flowchart is for discriminating the kind of an occupant on the basis of the discrimination condition differing corresponding to the result detected by the state detecting means 1 and the result measured by the load measuring means 2. The flowchart also shows an example procedure for discriminating the occupant by maintaining the occupant kind before the load change for a predetermined time T established on the basis of the kind before the load change and the result detected by the state detecting means 1, when the kind of the occupant discriminated with the discrimination condition changes to the kind different from that before load change in accordance with the load change due to the change in occupant posture.

The processes at #1 to #31a and #31b are the same as described above, so that the description thereof is omitted.

When the signal is determined to be "on" at #31b, it may be supposed that the occupant is a child sitting in a normal posture or a stooping adult as shown in FIGS. 10A to 10G and FIGS. 14A to 14G. Hence, a threshold value A (first discrimination condition) is set as a normal threshold value X (#32) as shown in FIGS. 3A to 3E and FIG. 5, and t3 is set as the predetermined time T in the same way in FIG. 17 (#35c).

When the signal is determined to be "off" at #31b, it may be supposed that the occupant is a standing child as shown in FIGS. 9A to 9F and FIGS. 13A to 13F. Hence, a threshold value B (second discrimination condition) larger than a normal value is set as a threshold value X (#33a) as shown in FIGS. 3A to 3E and FIG. 5, and t2 is set as the predetermined time T in the same way in FIG. 17 (#35b).

When the signal is determined to be "on" at #31a, it may be possibly discriminated that the occupant is an adult as shown in FIGS. 8A to 8G and FIGS. 12A to 12G. Hence, a threshold value C (third discrimination condition) is set as a threshold value X (#34), which is applied when the load measured by the load measuring means 2 varies from the smaller side to the larger side, as shown in FIGS. 3A to 3E and FIG. 5, and t1 is set as the predetermined time T in the same way in FIG. 17 (#35a).

When the signal is determined to be "off" at #31a, it might be possibly discriminated to be "adult" although the occupant is a standing child as shown in FIGS. 11A to 11F and FIGS. 15A to 15F. Hence, a threshold value B (second discrimination condition) larger than a normal value is set as a threshold value X (#33b) as shown in FIGS. 3A to 3E and FIG. 5, and t4 is set as the predetermined time T in the same way in FIG. 17 (#35d).

The processes subsequent to steps #4a and #4b are the same as described above with reference to FIG. 17, so that the description thereof is omitted. In such a manner, by the integration of the first embodiment with the second embodiment, occupant discrimination can be achieved in high accuracy while even when the occupant is discriminated to be the different kind, the discrimination can be quickly returned to the precise one. By the first embodiment in the main, the high-accuracy occupant discrimination is achieved, and by the second embodiment, the precise discriminated result is maintained while even when the occupant is discriminated to be the different kind, the discrimination can be quickly returned to the precise one. An example of this effect will be described as follows.

For example, in FIGS. 9A to 9F and FIGS. 13A to 13F, if the threshold value X would be fixed at the normal threshold value A, the occupant might be discriminated to be "adult" although the occupant is a child as shown FIGS. 9D and 9E and FIGS. 13D and 13E. Thus, according to the second embodiment, the former determination (discrimination) result shown in FIGS. 9C and 13C is held so as to maintain it for a predetermined time as the discrimination result. Whereas, by adding the configuration of the first embodiment thereto, the threshold value X can be changed to the threshold value B larger than a normal value. Consequently, the effect of the first embodiment is also obtained, so that the occupant cannot be discriminated to be "adult" although the occupant is a child so as to precisely discriminate the occupant to be the child.

As described above, the present invention can provide a vehicle occupant discrimination apparatus capable of precisely discriminating a vehicle occupant using load data detected by a small number of load sensors for detecting a load applied to a vehicle seat.

What is claimed is:

1. A vehicle occupant discrimination apparatus for discriminating the kind of an occupant on a vehicle seat on the basis of the load applied to the vehicle seat,
    load measuring means for measuring the load applied to the vehicle seat;
    state detecting means for detecting the occupant state on the vehicle seat; and
    discriminating means for discriminating the kind of the occupant on the basis of a discrimination condition discriminating whether the occupant is an adult or a child and the result measured by the load measuring means,
    wherein the discriminating means discriminates the kind of the occupant on the basis of the discrimination condition differing in accordance with the result detected by the state detecting means;
    wherein when the state detecting means detects the presence of the occupant, the discriminating means discriminates the kind of the occupant on the basis of a first discrimination condition while discriminates the kind of the occupant on the basis of a second discrimination condition using a larger load than that in the first discrimination condition when the state detecting means detects no presence of the occupant.

2. The apparatus according to claim 1, wherein the discriminating means discriminates the kind of the occupant on the basis of the discrimination conditions differing from a case, where the load measured by the load measuring means varies from a smaller side to a larger side, to a case where it varies from the larger side to the smaller side.

3. The apparatus according to claim 1, wherein the state detecting means detects a presence of an occupant body on the front side of the vehicle seat.

4. The apparatus according to claim 1, wherein the discriminating means includes discrimination state confirming means for confirming a former discrimination state, and wherein when the former discrimination state is an adult, the discriminating means discriminates the kind of the occupant on the basis of a third discrimination condition using a smaller load than that in the first discrimination condition while discriminates the kind of the occupant on the basis of the result detected by the state detecting means when the former discrimination state is a child.

5. The apparatus according to claim 1, wherein the load measuring means measures the load applied to the rear side of the vehicle seat.

6. A vehicle occupant discrimination apparatus for discriminating the kind of an occupant on a vehicle seat on the basis of the load applied to the vehicle seat, the apparatus comprising:

state detecting means for detecting the occupant state on the vehicle seat;

load measuring means for measuring the load applied to the vehicle seat; and discriminating means for discriminating the kind of the occupant on the basis of a discrimination condition discriminating whether the occupant is an adult or a child and the result measured by the load measuring means, wherein the discriminating means discriminates the kind of the occupant on the basis of the discrimination condition differing in accordance with the result detected by the state detecting means, wherein the discriminating means includes discrimination state confirming means for confirming a former discrimination state, wherein when the former occupant kind is an adult and the presence of an occupant body is detected by the state detecting means, or when the former occupant kind is a child and the presence of an occupant body is not detected by the state detecting means, the discriminating means determines the former occupant to be the kind of the occupant, and wherein when the former discrimination state is other than the states described above, the discriminating means discriminates the kind of the occupant on the basis of the result measured by the load measuring means.

7. A vehicle occupant discrimination apparatus for discriminating the kind of an occupant on a vehicle seat on the basis of the load applied to the vehicle seat, the apparatus comprising:

state detecting means for detecting the occupant state on the vehicle seat;

load measuring means for measuring the load applied to the vehicle seat; and discriminating means for discriminating the kind of the occupant on the basis of a discrimination condition discriminating whether the occupant is an adult or a child and the result measured by the load measuring means, wherein the discriminating means discriminates the kind of the occupant on the basis of the discrimination condition differing in accordance with the result detected by the state detecting means, wherein when the kind of the occupant discriminated on the basis of the discrimination condition changes to the kind different from that before load change in accordance with the load change due to change in sitting posture of the occupant, the discriminating means holds the kind before the load change for a predetermined time established on the basis of the kind before the load change and the result detected by the state detecting means.

* * * * *